(12) United States Patent
Kurtoglu et al.

(10) Patent No.: US 10,494,524 B2
(45) Date of Patent: Dec. 3, 2019

(54) ANTIFOULING COMPOSITION

(71) Applicant: BASF SE, Ludwigshafen (DE)

(72) Inventors: Yunus Emre Kurtoglu, Canton, MI (US); Diya Bandyopadhyay, Farmington Hills, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/742,326

(22) PCT Filed: Jul. 7, 2016

(86) PCT No.: PCT/US2016/041283
§ 371 (c)(1),
(2) Date: Jan. 5, 2018

(87) PCT Pub. No.: WO2017/007899
PCT Pub. Date: Jan. 12, 2017

(65) Prior Publication Data
US 2018/0194941 A1    Jul. 12, 2018

Related U.S. Application Data

(60) Provisional application No. 62/189,544, filed on Jul. 7, 2015.

(51) Int. Cl.
*C08L 75/08* (2006.01)
*B08B 17/06* (2006.01)
(Continued)

(52) U.S. Cl.
CPC ............ *C08L 75/08* (2013.01); *B08B 17/06* (2013.01); *C08G 18/3203* (2013.01); *C08G 18/3206* (2013.01); *C08G 18/4804* (2013.01); *C08G 18/4854* (2013.01); *C08G 18/4858* (2013.01); *C08G 18/5015* (2013.01); *C08G 18/61* (2013.01); *C08G 18/6674* (2013.01); *C08G 18/7671* (2013.01); *C08K 5/0091* (2013.01)

(58) Field of Classification Search
CPC ... C08L 75/08; B08B 17/06; Y10T 428/24479
See application file for complete search history.

(56) References Cited

U.S. PATENT DOCUMENTS 6,313,335 B1 * 11/2001 Roberts .............. C08G 18/0823
428/391
2007/0227428 A1    10/2007 Brennan et al.
(Continued)

FOREIGN PATENT DOCUMENTS

| EP | 1034204 A1 | 9/2000 |
| WO | 2013/190121 A1 | 12/2013 |
| WO | 2014/053983 A1 | 4/2014 |

OTHER PUBLICATIONS

International Search Report and Written Opinion for corresponding International Appln. No. PCT/US2016/041283; dated Nov. 11, 2016.
(Continued)

*Primary Examiner* — Catherine A. Simone
(74) *Attorney, Agent, or Firm* — DLA Piper LLP (US)

(57) ABSTRACT

An antifouling thermoplastic polyurethane (TPU) composition has a surface energy of from about 18 to about 26 mJ/m². The antifouling TPU composition comprises the reaction product of: (A) a polyetherol; (B) a silicone polyol; (C) a chain extender different than said polyetherol and said silicone polyol; and (D) an isocyanate. An article comprising the antifouling TPU composition and having a surface with a 3-dimensional surface topography resistant to adhesion of organisms.

18 Claims, 11 Drawing Sheets

(51) Int. Cl.
*C08G 18/48* (2006.01)
*C08G 18/50* (2006.01)
*C08G 18/61* (2006.01)
*C08G 18/76* (2006.01)
*C08G 18/32* (2006.01)
*C08K 5/00* (2006.01)
*C08G 18/66* (2006.01)

(56) References Cited

U.S. PATENT DOCUMENTS

2010/0226943 A1* 9/2010 Brennan ............ A41D 31/0077
  424/400
2011/0177020 A1  7/2011 Mahmoud
2013/0039153 A1  2/2013 Hartshorne et al.

OTHER PUBLICATIONS

International Preliminary Report on Patentability from corresponding International Appln. No. PCT/US2016/041283; dated Jan. 18, 2018.
International Preliminary Report on Patentability from corresponding International Appln. No. PCT/US2016/041286; dated Jan. 18, 2018.
Non-Final Office Action from counterpart U.S. Appl. No. 15/742,275, dated Jan. 11, 2019.

* cited by examiner

Example 14

Example 15

Example 16

Example 17

Article 18D
(unabraded)

Article 18D
(1000g.)

Article 18D
(750g.)

Comparative
TPU A
(1000,750,G.)

ANTIFOULING COMPOSITION

FIELD OF THE INVENTION

The instant invention generally relates to an antifouling thermoplastic polyurethane composition.

DESCRIPTION OF THE RELATED ART

Biofouling is the unwanted accumulation of organic and inorganic matter on a surface from a surrounding environment. Biofouling can be costly and dangerous.

In a marine environment, biofouling occurs when matter and marine organisms settle, attach, and grow on surfaces which are submerged in water. For example, biofouling can occur on the surfaces of navel vessels, bouys, underwater cables and lines, structures (e.g. bridges, piers, and docks), and even power generating facilities. The economic impact of marine biofouling is significant; marine biofouling increases hydrodynamic drag of marine vessels, and places a structural burden on vessels, bouys, underwater cables and lines, structures (e.g. bridges, piers, and docks), and even power generating facilities.

In a living body, biofouling occurs when matter and bacteria settle, attach, and grow on surfaces which are inserted in the living body. For example, biofouling can occur on the surfaces of cosmetic implants, artificial heart valves, and synthetic joints which are inserted in a human body. To this end, not only is the economic impact of biofouling costly, biofouling can be deadly.

SUMMARY OF THE INVENTION AND ADVANTAGES

An antifouling thermoplastic polyurethane (TPU) composition has a surface energy of from about 18 to about 26 mJ/m$^2$. The antifouling TPU composition comprises the reaction product of: (A) a polyetherol; (B) a silicone polyol; (C) a chain extender different than said polyetherol and said silicone polyol; and (D) an isocyanate. An article comprising the antifouling TPU composition and having a surface with a 3-dimensional surface topography is resistant to adhesion of organisms.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
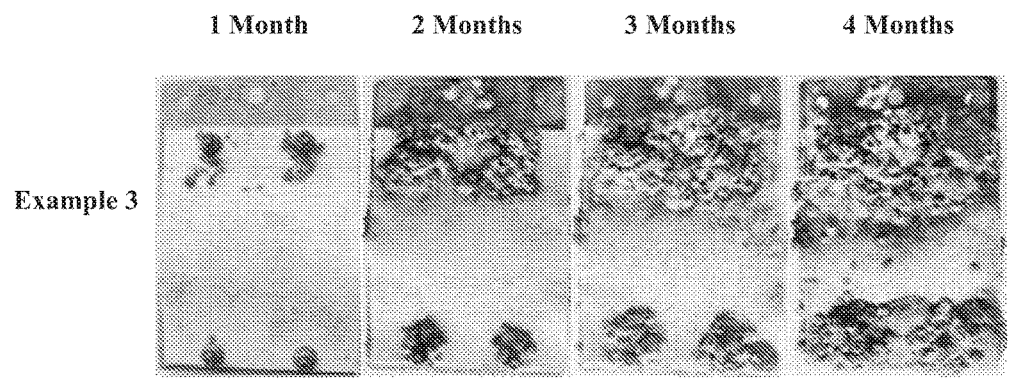
FIG. 1 is a perspective top view of the barnacle growth test results on the test plaque of Example 3.

The instant disclosure generally relates to an antifouling thermoplastic polyurethane (TPU) composition and articles formed from the antifouling composition which are resistant to biofouling. The antifouling TPU composition includes a thermoplastic polyurethane (TPU). The antifouling TPU composition may include one or more types of TPU.

The TPU typically comprises the reaction product of a polyol and an isocyanate. The TPU may comprise the reaction product of one or more types of the polyol with one or more types of the isocyanate. The polyol can be any polyol known in the art. The polyol includes one or more OH functional groups, typically at least two OH functional groups. In various embodiments, polyol is selected from the group of polyether polyols, polyester polyols, polyether/ester polyols, silicone polyols, fluorinated polyols, biopolyols, polytetrahydrofuran, and combinations thereof; however, other polyols may also be employed.

In various embodiments, a polyester polyol is reacted with the isocyanate to form a polyester-based TPU. Of course, various combinations of different polyols can be reacted to form the polyester-based TPU. Suitable polyester polyols may be produced from a reaction of a dicarboxylic acid and a glycol having at least one primary hydroxyl group. Suitable dicarboxylic acids may be selected from, but are not limited to, the group of adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for use in producing the polyester polyols may be selected from, but are not limited to, the group of ethylene glycol, butylene glycol, hexanediol, bis(hydroxymethylcyclohexane), 1,4-butanediol, diethylene glycol, 2,2-dimethyl propylene glycol, 1,3-propylene glycol, and combinations thereof.

In various embodiments, a polyether polyol is reacted with the isocyanate to form a polyester-based TPU. Of course, various combinations of different polyols can be reacted to form the polyester-based TPU. In other words, the TPU of this embodiment is a polyether-based TPU comprising the reaction product of a polyether polyol and an isocyanate. Suitable polyether polyols may be selected from, but are not limited to, the group of polytetramethylene glycol, polyethylene glycol, polypropylene glycol, and combinations thereof.

In various embodiments, a polytetrahydrofuran (polyTHF) is reacted with the isocyanate to form the TPU. PolyTHF is synthesized by the polymerization of tetrahydrofuran. The polyTHF and one or more additional polyols can be reacted with the isocyanate to form the TPU. Of course, various combinations of different polyols can be reacted to form the TPU. For example, the polyTHF and a polyether polyol can be reacted to form the TPU. One or more types of the polyTHF can be reacted to form the TPU. The polyTHF is also known in the art as poly(tetramethylene ether) glycol or poly(tetramethylene oxide) and, in some embodiments, has the following general structure:

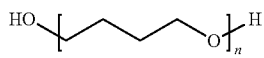

wherein n is an integer of from about 1 to about 100, alternatively from about 5 to about 75, alternatively from about 5 to about 50, alternatively from about 5 to about 20. Alternatively, in such embodiments, the polyTHF can have a weight average molecular weight of from about 225 to about 3000, alternatively from about 225 to about 275, alternatively from about 625 to about 675, alternatively from about 950 to about 1050, alternatively from about 1750 to about 1850, alternatively from about 1950 to about 2050, alternatively from about 2800 to about 3000, g/mol. In these embodiments, the polyol can have a hydroxyl number of from about 30 to about 1000, alternatively from about 498 to about 537.4, alternatively from about 408 to about 498.7, alternatively from about 166.2 to about 179.5, alternatively from about 106.9 to about 118.1, alternatively from about 60.6 to about 64.1, alternatively from about 54.7 to about 57.5, alternatively from about 34.7 to about 40.1, mgKOH/g. Suitable polytetrahydrofurans/polyTHFs include, but are not limited to, polyTHFs commercially available from BASF Corporation of Florham Park, N.J. under the trade name polyTHF®.

In various embodiments, a silicone polyol is reacted to form a silicone TPU. Said differently, the silicone polyol, and the isocyanate can be chemically reacted to form the TPU. Of course, various combinations of different polyols can be reacted to form the polyester-based TPU.

As defined herein, a silicone polyol is any chemical moiety which includes a silicon atom and a hydroxyl group. To this end, the silicone polyol can comprise a silicone, a polysiloxane, and/or a polyorganosiloxane. Alternatively, the silicone polyol can comprise a polyether or a polyester polyol which includes silicone. In a preferred embodiment the silicone polyol is a silicone diol and is a liquid at room temperature.

In various embodiments, the silicone polyol comprises a silicone diol having the following general structure:

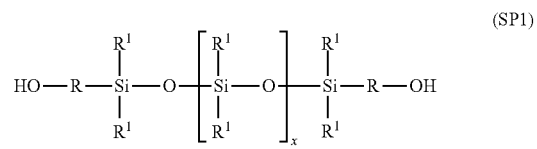

wherein x is an integer of from about 5 to about 15,000, alternatively from about 100 to about 12,000; R is a hydrocarbon; and each respective $R^1$ is a hydrocarbon or a hydrogen atom. In other words, the $R^1$ groups can be different as long as they are a hydrocarbon or a hydrogen atom.

In various embodiments, the silicone polyol has the following general structure:

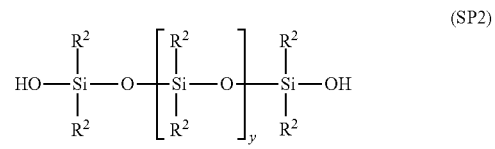

wherein y is an integer of from about 5 to about 15,000, alternatively from about 100 to about 12,000; $R^2$ is a hydrocarbon or a hydrogen atom.

In various preferred embodiments, the silicone polyol comprises a silicone diol having the following general structure:

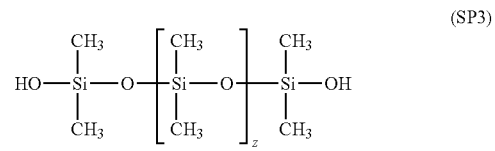

wherein z is an integer of from about 5 to about 15,000, alternatively from about 100 to about 12,000.

As set forth above, the silicone polyol is any chemical moiety which includes a silicon atom and a hydroxyl group. In some embodiments, the silicone polyol has a hydroxyl functionality of from about 1 to about 10, alternatively from about 1 to about 5, alternatively about 2.

In many embodiments, the silicone polyol is a siloxane, e.g. having structures such as SP1, SP2, and SP3 shown previously, which has a siloxane content of from about 0.2 to about 10, alternatively from about 1 to about 5, alternatively from about 1 to about 3.5, % based on the total number of siloxane units. Alternatively, the silicone polyol has a hydroxyl number of from about 10 to about 1000, alternatively from about 10 to about 750, alternatively from about 20 to about 200, alternatively from about 15 to about 250, alternatively from about 15 to about 150, mgKOH/g.

Suitable silicone polyols include, but are not limited to, silicone polyols commercially available from Dow Corning of Midland, Mich. under the trade name XIAMETER®.

In various embodiments, a halogenated polyol is reacted with the isocyanate to form a halogenated TPU. Of course, various combinations of different polyols can be reacted to form the TPU. That is, the halogenated polyol and one or more additional polyols can be reacted with the isocyanate to form the TPU. For example, the halogenated polyol and a silicone polyol can be reacted to form the TPU. One or more types of the halogenated polyol can be reacted to form the TPU. The halogenated polyol may be any suitable halogenated polyol as is known in the art. For example, the halogenated polyol may comprise a polyester polyol, a polyether polyol, or combinations thereof. As another example, the halogenated polyol may comprise an aliphatic polyol, a cycloaliphatic polyol, an aromatic polyol, a heterocyclic polyol, or combination thereof.

It is to be appreciated that the term "halogenated" means comprising one or more of a substituent comprising a halogen atom. When the halogenated polyol includes one or more of the substituents, the substituents may all be the same or may be different from one another. The substituent may be any halogen atom, such as a fluorine atom, a chlorine atom, a bromine atom, an iodine atom, or an astatine atom. Typically, the halogenated polyol comprises one or more substituents selected from the group of a chlorine atom, a bromine atom, and combinations thereof. Without being bound or limited by any particular theory, it is believed that increasing the number of the substituents of the halogenated polyol allows the article to have low surface energy.

In a preferred embodiment, a fluoroinated polyol is reacted with the isocyanate to form a fluorinated TPU. For example, in such an embodiment, a fluoroinated diol having the following general structure is reacted to form the fluorinated TPU:

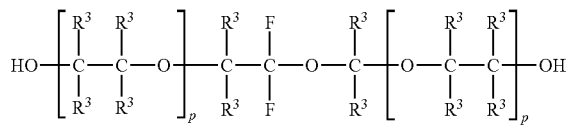

wherein p is an integer of from about 5 to about 15,000, alternatively from about 100 to about 12,000; $R^2$ is a hydrocarbon or a hydrogen atom.

In various other preferred embodiments, the fluorinated polyol comprises a silicone diol having the following general structure:

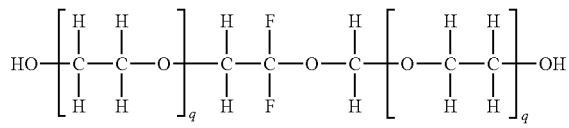

wherein q is an integer of from about 5 to about 15,000, alternatively from about 100 to about 12,000.

The polyol of the subject disclosure, as is described herein, can include functional groups other than hydroxyl groups, such as alkenyl groups, alkoxy groups, etc. In various embodiments including such functional groups, the functional groups may be terminal, pendent, or both. Typically, the functional groups are terminal. For example, the silicone polyol may be dimethylvinyl endblocked, divinylmethyl endblocked, dimethylhydroxyl endblocked, dihydroxylmethyl endblocked, etc.

The polyol of the subject disclosure, as is described herein, can be substituted. By "substituted," it is meant that one or more hydrogen atoms of the polyol may be replaced with atoms other than hydrogen (e.g. a halogen atom, such as chlorine, fluorine, bromine, etc.), or a carbon atom may be replaced with an atom other than carbon, i.e., R may include one or more heteroatoms within the chain, such as oxygen, sulfur, nitrogen, etc. For example, the silicone polyol can include fluorine. As another example, the polyether polyol can include bromine.

In various embodiments, a chain extender is also reacted to form the TPU. Said differently, the chain extender, the polyol, and the isocyanate can be chemically reacted to form the TPU. In one embodiment, the TPU may comprise the reaction product of the chain extender and the isocyanate in the absence of the polyol. Suitable chain extenders may be selected from, but are not limited to, the group of diols including ethylene glycol, propylene glycol, butylene glycol, 1,4-butanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol; diamines including ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; alkanol amines including ethanol amine, aminopropyl alcohol, 2,2-dimethyl propanol amine, 3-aminocyclohexyl alcohol, and p-aminobenzyl alcohol; and combinations of any of the aforementioned chain extenders. In a preferred embodiment, 1,4-butanediol is reacted with the polyol and the isocyanate to form the TPU.

As is set forth above, the TPU is the reaction product of one or more isocyanates and one or more polyols. That is, one or more isocyanates can be used to form the TPU. The isocyanate may be a polyisocyanate having two or more functional groups, e.g. two or more NCO functional groups. In various embodiments, the isocyanate may include, but is not limited to, monoisocyanates, diisocyanates, polyisocyanates, biurets of isocyanates and polyisocyanates, isocyanurates of isocyanates and polyisocyanates, isocyanate prepolymers, and combinations thereof. Suitable isocyanates include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), isocyanate prepolymers, and combinations thereof.

The isocyanate may comprise an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

In some embodiments, the isocyanate may comprise an isocyanurated HDI, such as HDI isocyanural. Isocyanurated HDIs, which are typically highly functional low-viscosity isocyanates, react with the bioresin component to form a coating which has excellent UV, chemical, and solvent resistance, has excellent adhesion and durability, and is hard yet flexible. In one such embodiment, the isocyanate has an NCO content of from about 21.5 to about 22.5 weight percent, a viscosity at 23° C. of from about 2,500 to about 4,500 mPasec, and a percent solids of about 100 weight percent.

Specific isocyanates that may be used include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisopropyl-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethylbenzene-2,4,6-triisocyanate; 1-ethyl-3,5-diisopropyl benzene-2,4,6-triisocyanate and 1,3,5-triisopropyl benzene-2,4,6-triisocyanate. Other suitable polyamide imide coatings can also be prepared from aromatic diisocyanates or isocyanates having one or two aryl, alkyl, aralkyl or alkoxy substituents wherein at least one of these substituents has at least two carbon atoms. Of course, various combinations of the isocyanates referenced herein can be used to form the TPU.

Suitable isocyanates include, but are not limited to, isocyanates commercially available from BASF Corporation of Florham Park, N.J. under the trade names LUPRANATE® and BASONAT®.

In some embodiments, the TPU comprises the reaction product of a polyetherol, an isocyanate, and a chain extender. For example, the TPU comprises the reaction product of polytetramethylene ether glycol obtained by the polymerization of tetrahydrofuran, a chain extender, and an aromatic isocyanate.

The polyol(s) and the isocyanate may be reacted in the presence of various additives to form the TPU. The one or more additives that may be present while the TPU is being formed, or present in the TPU once formed, include additives selected from the group of anti-foaming agents, processing additives, plasticizers, chain terminators, surface-active agents, adhesion promoters, flame retardants, antioxidants, water scavengers, fumed silicas, dyes, ultraviolet light stabilizers, fillers, thixotropic agents, transition metals, catalysts, blowing agents, surfactants, cross-linkers, inert diluents, and combinations thereof. The additive(s) may be included in any amount as desired by those of skill in the art.

Typically, the isocyanate and the polyol and/or chain extender are reacted at an isocyanate index of from about 90 to about 115, alternatively from about 95 to about 105, alternatively from about 105 to about 110.

In some embodiments, the antifouling TPU composition comprises the reaction product of: (A) a polyetherol; (B) a silicone polyol; (C) a chain extender different than said polyetherol and said silicone polyol; and (D) an isocyanate. In some such embodiments, the polyetherol comprises polytetramethylene ether glycol obtained by the polymerization of tetrahydrofuran and has a hydroxyl number of from about 30 to about 1000 mgKOH/g. In some such embodiments, the silicone polyol (B) comprises an OH end-blocked polydimethylsiloxane having a silanol having a hydroxyl number of about 2, and a viscosity at 25° C. of from about 20 to about 200, cSt. In some such embodiments, the chain extender comprises 1,4-butanediol. Hydroxy functional components (A) through (D) are, in some such embodiments, reacted with diphenylmethane diisocyanate (MDI) and/or polymeric diphenylmethane diisocyanate (pMDI).

In embodiments where the antifouling TPU composition comprises the reaction product of: (A) a polyetherol; (B) a silicone polyol; (C) a chain extender different than said polyetherol and said silicone polyol; and (D) an isocyanate, reactants (A) through (D) are reacted in the following amounts to form the reaction product: from about 25 to about 75, alternatively from about 40 to about 60, weight percent of said polyetherol; from about 2 to about 25, alternatively from about 2 to about 12, weight percent of said silicone polyol; from about 1 to about 15, alternatively from about 5 to about 10, weight percent of said chain extender; and from about 10 to about 60, alternatively about 25 to about 45, weight percent of said isocyanate. Weight percent of reactants (A) through (D) is based on the total weight of reactants (A) through (D) which are reacted to form said reaction product.

Obviously, embodiments where the antifouling TPU composition comprises the reaction product of: (A) the polyetherol; (B) the silicone polyol; (C) the chain extender different than said polyetherol and the silicone polyol; and (D) an isocyanate are not limiting in nature. Further embodiments utilizing the various reactants, e.g. polyols, chain extenders and isocyanates are contemplated. For example, in some embodiments, a fluorinated polyol is reacted into said reaction product. In other such embodiments, a fluorinated polyol can be used in lieu of the silicone polyol. Likewise, the antifouling TPU composition is not limited to the reaction product described above. For example, the antifouling TPU composition can also include an antifouling additive, e.g. zinc pyrithione and/or other additives as is described below.

The antifouling TPU composition has a surface energy of from about 18 to about 26 mJ/m$^2$.

An article comprising the antifouling TPU composition and having a surface with a 3-dimensional surface topography is resistant to adhesion of organisms.

The TPU can be any TPU known in the art. In one embodiment, the TPU is selected from the group of polyester-based TPUs, polyether-based TPUs, silicon TPUs, halogenated TPUs, and combinations thereof. For purposes of the subject disclosure, a "polyester-based" TPU is a TPU that includes at least two ester groups present therein and/or is formed from a reactant that includes a polyester bond. Likewise, also for purposes of the instant application, a "polyether-based" TPU is a TPU that includes at least two ether groups present therein and/or is formed from a reactant that includes a polyether bond. It is to be appreciated that for both polyester-based and polyether-based TPUs, reactants can be used to form the TPUs that do not include polyester or polyether groups therein. For purposes of the subject disclosure, a silicone TPU is a TPU that includes a silicon atom and/or is formed from a reactant that includes a silicon atom. Of course, the silicon modified TPU can be polyester-based and/or polyether-based. Further, it is also to be appreciated that suitable TPUs for purposes of this disclosure are not limited to polyester-based, polyether-based TPUs, and silicone TPUs, and that other TPUs may also be suitable that do not include ether or ester groups present therein.

Suitable TPUs include, but are not limited to, TPUs commercially available from BASF Corporation of Florham Park, N.J. under the trade name ELASTOLLAN®. Further, various suitable TPUs commercially available under the trade name ELASTOLLAN® include ELASTOLLAN® 600 Series TPUs, 800 Series TPUs, 1100 Series TPUs, 1200 Series TPUs, B Series TPUs, C Series TPUs, S Series TPUs, and Speciality TPUs.

Referring now to the TPU, in various embodiments, the TPU typically has: a Shore D Hardness of from about 40 to about 100 pts as determined by DIN53505; and a specific gravity of from about 1.1 to about 1.3, alternatively from about 1.17 to about 1.23, g/cm$^3$; a tensile strength of from about 2,000 to about 10,000, alternatively from about 3,000 to about 9,000, psi at 23° C. as determined by ASTM D412; a tensile stress at 100% elongation of from about 300 to about 5000, alternatively from about 500 to about 4000, psi at 23° C. as determined by ASTM D412; a tear strength of greater than about 300, alternatively greater than about 500, pli at 23° C. as determined by ASTM D624, Die C; and/or a Taber abrasion resistance of from about 25 to about 100, alternatively from about 35 to about 85, mg when tested in accordance with ASTM D1044.

It is contemplated that the antifouling TPU composition may include one or more TPUs. When more than one TPU is included in the antifouling TPU composition, greater than one TPU meets the description of the TPUs set forth above, and the additional TPUs are not limited to any particular TPU.

In one embodiment, a single, polyether-based TPU is present in the antifouling TPU composition in an amount of from about 70 to about 85 parts by weight per 100 parts by weight of the antifouling TPU composition. In this embodiment, the polyether-based TPU has a Shore D Hardness of from about 51 to about 55 and a specific gravity of from about 1.15 to about 1.17.

In various embodiments, the antifouling TPU composition includes a compound, an oligomer, a polymer, etc., which includes silicon and/or halogen atoms. In other words, in various embodiments, the antifouling TPU composition includes a mixture comprising the TPU and a compound, an oligomer, and/or a polymer which includes silicon and/or halogen atoms.

For example, in some embodiments, the antifouling TPU composition includes a silicone, a polysiloxane, a polyorganosiloxane, or combinations thereof. In a preferred embodiment, the antifouling TPU composition includes an ultra high molecular weight polydimethylsiloxane (PDMS). Suitable silicones include, but are not limited to, silicones commercially available from Multibase, a Dow Corning Corporation of Midland, Mich. under the trade name MB Siloxane® Masterbatch.

As another example, in some embodiments, the antifouling TPU composition includes a halogenated polymer. In one such embodiment the antifouling TPU composition includes a fluorinated polymer. The fluorinated polymer may be, for example, selected from the group of a polyvinyl fluoride polymer, a polyvinylidene fluoride polymer, a vinylidene fluoride/hexafluoropropylene copolymer, a tetrafluoroethylene/hexafluoropropylene/vinylidene fluoride type copolymer, a tetrafluoroethylene/propylene copolymer, a tetrafluoroethylene/hexafluoropropylene/propylene copolymer, an ethylene/tetrafluoroethylene type copolymer, an ethylene/chlorotrifluoroethlyene copolymer, a hexafluoropropylene/tetrafluoroethylene copolymer, a perfluoro(alkyl vinyl ether)/tetrafluoroethylene type copolymer, and combinations thereof. In certain embodiments, the fluorinated polymer is selected from the group of an ethylene/tetrafluoroethylene copolymer, an ethylene/chlorotrifluoroethlyene copolymer, a polyvinyl fluoride, a polyvinylidene fluoride, and combinations thereof. In other embodiments, the fluorinated polymer is selected from the group of an ethylene/tetrafluoroethylene copolymer, an ethylene/chlorotrifluoroethlyene copolymer, and combinations thereof. In one specific embodiment, the fluorinated polymer comprises an ethylene/tetrafluoroethylene copolymer, and in another specific embodiment, the fluorinated polymer comprises an ethylene/chlorotrifluoroethlyene copolymer.

In various embodiments, the antifouling TPU composition includes an antifouling additive, e.g. a biocide. Of course, the antifouling TPU composition can include one or more different types of the antifouling additive. The antifouling additive helps prevent the build-up of organisms such as marine species, including micro-foulers (which are food sources for the macrofoulers), on the article.

The one or more antifouling additives can be biocidal, foul release, or both. Exemplary biocidal antifouling additives include, but are not limited to, metal or metallic/non-metallic compounds that are poisonous to marine organisms and thus prevent or reduce biofouling by making it difficult for marine organisms to survive when in contact with the article. Illustrative foul release antifouling additives include, but are not limited to, silicon or halogenated compounds that reduce the surface energy of the article and thus prevent or reduce the ability of marine organisms to attach thereto.

Marine organisms as defined herein include, but are not limited to, "soft fouling organisms," which can include plants and invertebrates, such as slime, algae, kelp, soft corals, tunicates, hydroids, sponges and anemones; or "hard fouling organisms," which can include invertebrates having some type of hard outer shell, such as barnacles, tubeworms and molluscs.

The antifouling additive can be a metal or metal alloy. The metal or metal alloy can include any one or more metals from groups Ib, IIa, IIb, IIIa, IIIb, IVa, IVb, Va, Vb, VIb, VIIb, and VIII of the Periodic Table of Elements. The antifouling additive can include, but is not limited to, copper, nickel, palladium, platinum, tantalum, tellurium, titanium, beryllium, magnesium, manganese, calcium, silver, gold, zinc, cadmium, mercury, boron, aluminum, molybdenum, scandium, yttrium, silicon, zirconium, tin, arsenic, alloys thereof, and combinations thereof. The metal alloy can be or include, for example, copper-nickel alloy, copper-beryllium alloy, beryllium-cobalt-copper alloy, beryllium-cobalt-silicon-copper alloy, or combinations thereof.

Suitable exemplary antifouling additives include, but are not limited to, inorganic compounds. The antifouling additive can be or include oxides, carbonates, halides, hydroxides, cyanides, nitrates, nitrites, nitrides, sulfates, sulfites, sulfides, or combinations thereof of a metal or metal alloy. In one or more embodiments, the antifouling additive can be or include, oxides, carbonates, halides, hydroxides, cyanides, nitrates, nitrites, nitrides, sulfates, sulfites, or sulfides of copper, nickel, palladium, platinum, tantalum, tellurium, titanium, beryllium, magnesium, manganese, calcium, silver, gold, zinc, cadmium, mercury, boron, aluminum, molybdenum, scandium, yttrium, silicon, zirconium, tin, arsenic, lead, oxides thereof, alloys thereof, and combinations thereof.

Suitable exemplary antifouling additives include, but are not limited to, products of reaction between a metal or metal compound and a resin acid. The resin acid can be or include abietic acid, pimaric acid, neoabietic acid, dehydroabietic acid, palustric acid, levopimaric acid, isopimaric acids, derivatives thereof, and mixtures thereof. For example, the antifouling additive can be or include products of reaction between copper or a copper compound and rosin, or products of reaction between tin or a tin compound and rosin.

Suitable exemplary antifouling additives include, but are not limited to, organometallic compounds. The antifouling additive can be or include organotin compounds. In one or more embodiments, the organotin compounds can include, but are not limited to, a trialkyl tin, triaryl tin, or both. Illustrative examples of organotin compounds can be or include bistributyl tin oxide, tributyl tin chloride, tributyl tin fluoride, tributyl tin acetate, tributyl tin nicotinate, tributyl tin versatate, bistributyl tin, triphenyl tin hydroxide, bistriphenyl tin alpha-dibromosuccinate, bistriphenyl tin oxide, bistryphenyl tin monochloromaleinate, and other organotin compounds.

Suitable exemplary antifouling additives include, but are not limited to, organocopper compounds. In one or more embodiments, the organocopper compounds can include, but are not limited to, copper acetate, oxine copper, copper nonylphenolsulfonate, copper bis(ethylenediamine)-bis(dodecylbenzenesulfonate), copper naphthenate, copper bis (pentachlorophenolate), copper pyrithione, copper naphthenate, and derivatives thereof.

Suitable exemplary antifouling additives include, but are not limited to, other organometallic compounds, which can include, but are not limited to, organonickel compounds, such as nickel acetate and nickel dimethyldithiocarbamate; organozinc compounds, such as zinc acetate, zinc carbamate, bis(dimethylcarbamoyl) zinc ethylene-bis(dithiocarbamate), zinc dimethyldithiocarbamate, zinc pyrithione, and zinc ethylene-bis(dithiocarbamate); and mixed metal-containing organic compounds such as (polymeric) manganese ethylene bis dithiocarbamate complexed with zinc salt (mancozeb), and derivatives thereof. In a preferred embodiment, the antifouling additive comprises zinc pyrithione which has the following general structure:

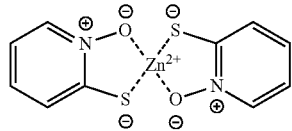

Suitable exemplary antifouling additives include, but are not limited to, alpha-dibromosuccinate; biocidal metal carboxylates such as copper naphthenate or copper stearate; metal (e.g. Na, K, Zn, Pb, Cu, Fe, Ni, Mg, Se) dialkyl dithiocarbamates such as zinc dimethyl dithiocarbamate and thiuram disulfide; sulfamides such as phthalylsulfathiazole, sulfaethydrole, sulfanilidopyridine or sulfamethoxyine; pyrrole and imidazole compounds such as glyodine, fentizole or polycide; thioxane and thioxanthone compounds such as terazol, asterol or mylone; amides such as nicarbazin, 3,4, 5-tribromosalicylanilide, N-trichloromethyl-mercaptophthalimide or 3,5-dinitrobenzamide; polyhexamethyleneguanidine salts; and derivatives thereof.

Suitable exemplary antifouling additives include, but are not limited to, a metal-free organic compound, such as N-trihalomethylthiophthalimides, trihalomethylthiosulphamides, dithiocarbamic acids, N-arylmaleimides, 3-(substituted amino)-1,3 thiazolidine-2,4-diones, dithiocyano compounds, triazine compounds, oxathiazines, 2,4,5,6-tetrachloroi sophthalonitrile, N,N-dim ethyldichlorophenylurea, 4,5-dichloro-2-n-octyl-4-isothiazoline-3-one, N,N-dimethyl-N'-phenyl-(N-fluorodichloromethylthio)-sulfamide, tetramethylthiuramdisulphide, 3-iodo-2-propinylbutyl carbamate, 2-(methoxycarbonylamino)benzimidazole, 2,3,5,6-tetrachloro-4-(methylsulphonyl)pyridine, diiodomethyl-p-tolyl sulphone, phenyl(bispyridine)bismuth dichloride, 2-(4-thiazolyl)benzimidazole, dihydroabietyl amine, N-methylol formamide and pyridine triphenylborane, and others.

Suitable exemplary antifouling additives include, but are not limited to, one or more pesticides. The pesticide can be or include one or more fungicides, herbicides, insecticides, algicides, molluscicides, bacteriocides, or combinations thereof. The fungicide can be or include aliphatic nitrogen fungicides, such as butylamine, cymoxanil, dodicin, dodine, guazatine, and iminoctadine; amide fungicides, such as bixafen, carpropamid, chloraniformethan, cyflufenamid, diclocymet, ethaboxam, fenoxanil, flumetover, furametpyr, mandipropamid, penthiopyrad, prochloraz, quinazamid, silthiofam and triforine; acylamino acid fungicides, such as benalaxyl, benalaxyl-M, furalaxyl, metalaxyl, metalaxyl-M and pefurazoate; anilide fungicides, such as benalaxyl, benalaxyl-M, boscalid, carboxin, fenhexamid, isotianil, metalaxyl, metalaxyl-M, metsulfovax, ofurace, oxadixyl, oxycarboxin, pyracarbolid, thifluzamide and tiadinil; benzanilide fungicides, such as benodanil, flutolanil, mebenil, mepronil, salicylanilide and tecloftalam; furanilide fungicides, such as fenfuram, furalaxyl, furcarbanil and methfuroxam; sulfonanilide fungicides, such as flusulfamide; benzamide fungicides, such as benzohydroxamic acid, fluopicolide, fluopyram, tioxymid, trichlamide, zarilamid, zoxamide; furamide fungicides, such as cyclafuramid and furmecyclox; phenylsulfamide fungicides, such as dichlofluanid and tolylfluanid; sulfonamide fungicides amisulbrom and cyazofamid; valinamide fungicides, such as benthiavalicarb and iprovalicarb; antibiotic fungicides, such as aureofungin, blasticidin-S, cycloheximide, griseofulvin, kasugamycin, natamycin, polyoxins, polyoxorim, streptomycin and validamycin; strobilurin fungicides, such as azoxystrobin, dimoxystrobin, fluoxastrobin. kresoxim-methyl, metominostrobin, orysastrobin, picoxystrobin, pyraclostrobin and trifloxystrobin; aromatic fungicides, such as biphenyl, chlorodinitronaphthalene, chloroneb, chlorothalonil, cresol, dicloran, hexachlorobenzene, pentachlorophenol, quintozene, sodium pentachlorophenoxide and tecnazene; benzimidazole fungicides, such as benomyl, carbendazim, chlorfenazole, cypendazole, debacarb, fuberidazole, mecarbinzid, rabenzazole and thiabendazole; benzimidazole precursor fungicides, such as furophanate, thiophanate and thiophanate-methyl; benzothiazole fungicides, such as bentaluron, chlobenthiazone and TCMTB; bridged diphenyl fungicides, such as bithionol, dichlorophen and diphenylamine; carbamate fungicides, such as benthiavalicarb, furophanate, iprovalicarb, propamocarb, pyraclostrobin, pyribencarb, thiophanate and thiophanate-methyl; benzimidazolylcarbamate fungicides, such as benomyl, carbendazim, cypendazole, debacarb and mecarbinzid; carbanilate fungicides, such as diethofencarb; conazole fungicides (imidazoles), such as climb azole, clotrimazole, imazalil, oxpoconazole, prochloraz, and triflumizole; conazole fungicides (triazoles), such as azaconazole, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, uniconazole and uniconazole-P; copper fungicides, such as Bordeaux mixture, Burgundy mixture, Cheshunt mixture, copper acetate, copper carbonate, basic, copper hydroxide, copper naphthenate, copper oleate, copper oxychloride, copper silicate, copper sulfate, copper sulfate, basic copper zinc, chromate, cufraneb, cuprobam, cuprous oxide, mancopper and oxine-copper; dicarboximide fungicides, such as famoxadone and fluoroimide; dichlorophenyl dicarboximide fungicides, such as chlozolinate, dichlozoline, iprodione, isovaledione, myclozolin, procymidone and vinclozolin; phthalimide fungicides, such as captafol, captan, ditalimfos, folpet and thiochlorfenphim; dinitrophenol fungicides, such as binapacryl, dinobuton, dinocap, dinocap-4, dinocap-6, meptyldinocap, dinocton, dinopenton, dinosulfon, dinoterbon and DNOC; dithiocarbamate fungicides, such as azithiram, carbamorph, cufraneb, cuprobam, disulfuram, ferbam, metam, nabam, tecoram, thiram and ziram; cyclic dithiocarbamate fungicides, such as dazomet, etem and milneb; polymeric dithiocarbamate fungicides, such as mancopper, mancozeb, maneb, metiram, polycarbamate, propineb and zineb; imidazole fungicides, such as cyazofamid, fenamidone, fenapanil, glyodin, iprodione, isovaledione, pefurazoate and triazoxide; inorganic fungicides, such as potassium azide, potassium thiocyanate, sodium azide and sulfur; mercury fungicides, such as mercuric chloride, mercuric oxide and mercurous chloride; organomercury fungicides, such as (3-ethoxypropyl)mercury bromide, ethylmercury acetate, ethylmercury bromide, ethylmercury chloride, ethylmercury 2,3-dihydroxypropyl mercaptide ethylmercury phosphate, N-(ethylmercury)-p-toluenesulphonanilide, hydrargaphen, 2-methoxyethylmercury chloride, methylmercury benzoate, methylmercury, icyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrate, phenylmercury salicylate, thiomersal and tolylmercury acetate; morpholine fungicides, such as aldimorph, benzamorf, carbamorph, dimethomorph, dodemorph, fenpropimorph, flumorph and tridemorph; organophosphorus fungicides, such as ampropylfos, ditalimfos, edifenphos, fosetyl, hexylthiofos, iprobenfos, phosdiphen, pyrazophos, tolclofos-methyl and triamiphos; organotin fungicides, such as decafentin and fentin, tributyltin oxide; oxathiin fungicides, such as carboxin and oxycarboxin; oxazole fungicides, such as chlozolinate, dichlozoline, drazoxolon, famoxadone, hymexazol, metazoxolon, myclozolin, oxadixyl and vinclozolin; polysulfide fungicides, such as barium polysulfide, calcium polysulfide, potassium polysulfide and sodium polysulfide; pyrazole fungicides, such as bixafen, furametpyr, penthiopyrad, pyraclostrobin and rabenzazole; pyridine fungicides, such as boscalid, buthiobate, dipyrithione, fluazinam, fluopicolide, fluopyram, pyribencarb, pyridinitril, pyrifenox, pyroxychlor and pyroxyfur; pyrimidine fungicides, such as bupirimate, cyprodinil, diflumetorim, dimethirimol, ethirimol, fenarimol, ferimzone, mepanipyrim, nuarimol, pyrimethanil and triarimol; pyrrole fungicides, such as fenpiclonil, fludioxonil and fluoroimide; quinoline fungicides, such as ethoxyquin and halacrinate, 8-hydroxyquinoline sulfate, quinacetol and quinoxyfen; quinone fungicides, such as benquinox, chloranil, dichlone and dithianon; quinoxaline fungicides, such as chinomethionat, chlorquinox and thioquinox; thiazole fungicides, such as ethaboxam, etridiazole, metsulfovax, octhilinone, thiabendazole, thiadifluor and thifluzamide; thiocarbamate fungicides, such as methasulfocarb and prothiocarb; thiophene fungicides, such as ethaboxam and silthiofam; triazine fungicides, such as anilazine; triazole fungicides, such as amisulbrom, bitertanol, fluotrimazole, and triazbutil; urea fungicides, such as bentaluro, pencycuron, and quinazamid; and unclassified fungicides, such as acibenzolar, acypetacs, allyl alcohol, benzalkonium chloride, benzamacril, bethoxazin, carvone, chloropicrin, DBCP, dehydroacetic acid, diclomezine, diethyl pyrocarbonate, fenaminosulf, fenitropan, fenpropidin, formaldehyde, furfural, hexachlorobutadiene, iodomethane, isoprothiolane, methyl bromide, methyl isothiocyanate, metrafenone, nitrostyrene, nitrothal-isopropyl, OCH, 2-phenylphenol, phthalide, piperalin, probenazole, proquinazid, pyroquilon, sodium orthophenylphenoxide, spiroxamine, sultropen, thicyofen, tricyclazole, zinc naphthenate, or mixtures thereof.

Suitable exemplary antifouling additives include, but are not limited to, pesticides such as carboxylic acid derivatives, which can include benzoic acids and their salts, phenoxy and phenyl substituted carboxylic acids and their salts, and trichloroacetic acid and its salts; carbamic acid derivatives, which can include ethyl N,N-di(n-propyl)thiolcarbamate and pronamide; substituted ureas; substituted triazines; diphenyl ethers, which can include oxyfluorfen and fluoroglycofen; anilides such as propanil; oxyphenoxy herbicides; uracils; nitriles; and other organic herbicides such as dithiopy and thiazopyr.

Suitable exemplary antifouling additives include, but are not limited to, insecticides such as acephate, acethion, acetoxon, aldicarb, aldoxycarb, aldrin, allethrin, allyxycarb, alpha-cypermethrin, amidithion, amitraz, amlure, anethol, azethion, azinphos-ethyl, azinphos-methyl, azocyclotin, *Bacillus thuringiensis*, BCPE, bendiocarb, bensultap, benzoximate, benzyl acetate, benzyl benzoate, BHC, bifenthrin, binapacryl, bornyl, BPMC, bromophos, bromophos-ethyl, bromopropylate, bufencarb, buprofezin, butacarb, butocarboxim, butonate, butoxycarboxim, calcium arsenate, carbaryl, carbofuran, carbophenothion, carbosulfan, cartap, chlordane, chlordecone, chlordimeform, chlorfenethol, chlorfenson, chlorfensulphide, chlorfenvinphos, chlormephos, chlorobenzilate, chloropenozide, chloropropylate, chlorphoxim, chlorpyrifos, chlorpyrifos methyl, chlorthiophos, clofentezine, CPCBS, CPMC, crotoxyphos, crufomate, cryolite, cufraneb, cyanofenphos, cyanophos, cyanthoate, cyfluthrin, cyhexatin, cypermethrin, cyphenothrin, cyromazine, DAEP, DDT, DDVP, deltamethrin, demeton, demeton-5-methyl, demeton-O-methyl, demeton-S, demeton-5-methyl sulfoxid, demephion-O, demephion-S, dialifor, diazinon, dicapthon, dichlofenthion, dicofol, dicrotophos, dieldrin, dienochlor, diflubenzuron, dihydrorotenone, dimefox, dimetan, dimethoate, dimethrin, dinex, dinitrophenol, dinobuton, dinocap, dioxabenzofos, dioxacarb, dioxathion, disparlure, disulfoton, DMCP, DNOC, d-trans allethrin, endosulfan, endothion, endrin, entice, EPBP, EPN, esfenvalerate, ethiofencarb, ethion, ethoate-methyl, ethoprop, etrimfos, fenamiphos, fenazaflor, fenbutatin-oxide, fenitrothion, fenoxycarb, fenpropathrin, fenson, fensulfothion, fenthion, fenvalerate, flubenzimine, flucythrinate, fluenethyl, flufenoxuron, fluvalinate, fonofos, formetanate hydrochloride, formothion, fosmethilan, fosthietan, furathiocarb, furethrin, grandlure, heptachlor, HETP, hexythiazox, hydramethylnon, hydroprene, IPSP, isazophos, isobenzan, isofenphos, isoprocarb, isoprothiolane, isothioate, isoxathion, jodfenphos, kinoprene, lead arsenate, leptophos, lethane, lindane, lythidathion, malathion, mazidox, mecarbam, mecarphon, menazon, mephosfolan, methamidophos, methidathion, methiocarb, methomyl, methoprene, methoxychlor, methoxyfenozide, methyl parathion, methyl phencapton, mevinphos, mexacarbate, MIPC, mirex, monocrotophos, MTMC, naled, nicotine, nonachlor, omethoate, ovex, oxamyl, oxydeprofs, oxydisulfoton, oxythioquinox, paraoxon, parathion, paris green, permethrin, perthane, phencapton, phenthoate, phorate, phosalone, phosfolan, phosmet, phosnichlor, phosphamidon, phoxim, pirimicarb, pirimiphos-ethyl, pirimiphos-methyl, plifenate, profenofos, promecarb, propargite, propetamphos, propoxur, prothidathion, prothiophos, prothoate, PTMD, pyridaben, pyridaphenthion, quinalphos, resmethrin, ronnell, rotenone, ryania, s-bioallethrin, salithion, schradan, sodium fluosilicate, sophamide, sulfotepp, sulprofos, tebufenozide, tefluthrin, temephos, TEPP, terbufos, tetrachlorvinphos, tetradifon, tetramethrin, tetrasul, thallium sulfate, thiocarboxime, thiocyclam hydrogenoxalate, thiometon, tolclofos-methyl, toxaphene, triazamate, triazophos, trichlorfon, trichloronate, triflumuron, trimethacarb, vamidothion, and xylylcarb, and mixtures thereof.

Suitable exemplary antifouling additives include, but are not limited to, algicides such as 3-bethoxazin, copper(II) tetraoxosulfate, cybutryne, dichlone, dichlorophen, endothal, fentin, calcium hydroxide, nab am, quinoclamine, quinonamid, and simazine.

Suitable exemplary antifouling additives include, but are not limited to, molluscicides such as N-bromoacetamide, calcium arsenate, cloethocarb, copper acetoarsenite, copper sulfate, fentin, metaldehyde, methiocarb, niclosamide, pentachlorophenol, sodium pentachlorophenolate, tazimcarb, thiodicarb, tralopyril, bis(tributyltin) oxide, trifenmorph, trimethacarb.

Suitable exemplary antifouling additives include, but are not limited to, bacteriocides such as 2-bromo-2-nitropropane-1,3-diol, copper(II) hydroxide, methylphenol, 4,4'-dichloro-2,2'-methylenediphenol, di-2-pyridyl disulfide 1,1'-dioxide, N-[2-(2-dodecylaminoethylamino)ethyl]glycine, sodium (EZ)-4-dimethylaminobenzenediazosulfonate, formaldehyde, μ-(2,2'-binaphthalene-3-sulfonyloxy)bis (phenylmercury), bis(8-hydroxyquinolinium) sulfate ("8-hydroxyquinoline sulfate"), 1L-1,3,4/2,5,6-1-deoxy-2,3,4,5,6-pentahydroxycycohexyl 2-amino-2,3,4,6-tetradeoxy-4-α-iminoglycino)-α-D-arabino-hexo-pyranoside, 2-chloro-6-trichloromethylpyridine, 2-octyl-1,2-thiazol-3 (2H)-one, 5-ethyl-5,8-dihydro-8-oxo[1,3]dioxolo[4,5-g]quinoline-7-carboxylic acid, (4S,4aR,5S,5aR,6S,12aS)-4-dimethylamino-1,4,4a,5,5a,6,11,12a-octahydro-3-5,6,10,12,12a-hexahydroxy-6-methyl-1,11-dioxonaphthacene-2-carboxamide, 3-allyloxy-1,2-benzothiazole 1,1-dioxide, O-2-deoxy-2-methylamino-α-L-glucopyranosyl-(1-2)-O-5-deoxy-3-C-form-yl-α-L-lyxofuranosyl-(1-4)-N.sup.1, N.sup.3-diamidino-D-streptamine, 2',3,3',4,5,6-hexachlorophthalanilic acid, and sodium salt of (2-carboxyphenylthio)ethylmercury.

Suitable exemplary antifouling additives include, but are not limited to, 5-chloro-2-(2,4-dichlorophenoxy)phenol; 2-phenylphenol; benzisothiazolinone; bromine monochloride; manganese ethylenebisdithiocarbamate; zinc dimethyl dithiocarbamate; 2-methyl-4-t-butylamino-6-cyclopropylamino-s-triazine; 2,4,5,6-tetrachloroisophthalonitrile; N,N-dimethyl dichlorophenyl urea; zinc ethylenebisdithiocarbamate; copper thiocyanate; copper pyrithione; zinc pyrithione; chlorinated paraffin; 4,5-dichloro-2-n-octyl-3-isothiazolone; N-(fluorodichloromethylthio)-phthalimide; N,N-dimethyl-N'-phenyl-N'-fluorodichloromethylthio-sulfamide; zinc 2-pyridinethiol-1-oxide; tetramethylthiuram disulfide; 2,4,6-trichlorophenylmaleimide; 2,3,5,6-tetrachloro-4-(methylsulfonyl)-pyridine; 3-iodo-2-propynyl butyl carbamate; diiodomethyl p-tolyl sulfone; bis dimethyl dithiocarbamoyl zinc ethylenebisdithiocarbamate; phenyl (bispyridil) bismuth dichloride; 2-(4-thiazolyl)-benzimidazole; pyridine triphenyl borane; phenylamide compounds; pyridazinone compounds; or 2-haloalkoxyaryl-3-isothiazolones; derivatives thereof, and mixtures thereof.

Suitable exemplary antifouling additives include, but are not limited to, polyhydroxystyrene of the novolak type; (meth)acrylic acid and one or more (meth)acrylate or (meth) acrylamide; menadione triaminotriazine bisulfite(I) ("MTB"); menadione(bis) piperazine bisulfite(II) ("MBP"); 3-aryl-5,6-dihydro-1,4,2-oxathiazines and oxides thereof; 2-arylpyrrole; 3',4'-dichlorodecananilide; 3',5'-dichlorodecanailide; 3',4'-dichloro-3-chloropropaneanilide; N-(3,4-dichlorophenyl)heptanamide; octanilide; N-(3,4-dichlorophenyl)octanamide; N-(3,4-dichlorophenyl)hexanamide; 2-chloro-2',6'-diethyl-N-(methoxymethyl)acetanilide; 1,3-dithiolo(4,5-d)-1,3-dithiino-2-thione compounds; a lipid enzyme coated with 6 to 30 carbon atoms; one or more of 4,5-dichloro-2-n-octyl-4-isothiazolin-3-one, 2-n-octyl-4-isothiazolin-3-one, and salts thereof mixed with one or more compounds selected from 5-[2-(2-butoxyethoxy)ethoxymethyl]-6-propyl-1,3-benzodioxole and octachlorodipropyl ether; 4,5-dicyano-1,3-dithiole-2-one (or thione) containing oxygen or sulfur; 1,2,5-thiadiazolo-1,3-dithiole-2-one or thione; 3,5-dihalogeno-1,2,6-thiadiazin-4-one; hydantoin and substituted hydantoin, such as phenyloin; dichloro-s-triazinetrione, trichloro-s-triazinetrione; zinc dimethyldithiocarbamate; manganese ethylenebisdithiocarbamate; 2-methylthio-4-t-butylamino-6-cyclopropylamino-s-triazine; 2,4,5,6-tetrachloroisophthalonitrile; N,N-dimethyldichlorophenylurea; 4,5-dichloro-2-n-octyl-3(2H)-isothiazolone; N-(fluorodichloromethylthio)-phthalimide; N,N'-dimethyl-N'-phenyl-(N-fluorodichloromethylthio) sulfamide; 2,4,6-trichlorophenylmaleimide; 2,3,5,6-tetrachloro-4-(methylsulfonyl)pyridine; 3-iodo-2-propenylbutyl carbamate; diiodomethyl-p-tolylsulfone; dimethyldithiocarbamoylzinc ethylenebisdithiocarbamate; phenyl(bispyridine)bismuth dichloride; 2-(4-thiazolyl)benzimidazole; pyridine-triphenylborane; zinc ethylenebisdithiocarbamate; stearylamine-triphenylboron; and laurylamine-triphenylboron; 3-iodo-2-propynyl butyl carbamate; 5-chloro-2-(2,4-dichlorophenoxy)phenol; 3,4,4'-trichlorocarbanilide; derivatives thereof; and mixtures thereof.

Suitable exemplary antifouling additives include, but are not limited to, one or more isothiazolones, furanones, and combinations thereof. The antifouling additive can be 4,5-dichloro-2-n-octyl-4-isothiazolin-3-one. The antifouling additive can be (1'RS,5E)-3-(1'-Bromoethyl)-4-bromo-5-(bromomethylidene)-2(5H)-furanone; (1'RS)-3-(1'-Bromoethyl)-5-(dibromomethylidene)-2(5H)-furanone; (1'RS,5Z)-3-(1'-Bromohexyl)-4-bromo-5-(bromomethylidene)-2(5H)-furanone; and (1'RS)-3-(1'-Bromohexyl)-5-(dibromomethylidene)-2(5H)-furanone.

Suitable exemplary antifouling additives include, but are not limited to, a chlorinated organotin compound. Exemplary chlorinated organotin compounds include, but are not limited to, is-trialkylstannyl derivatives of chlorinated polycyclic dicarboxylic acids.

Suitable exemplary antifouling additives include, but are not limited to, antibiotics. Exemplary antibiotics include, but are not limited to, penicillin V, penicillin G, ampicillin, cephalosporin, chlortetracycline, neomycin, rifamycin, and variotin.

Suitable exemplary antifouling additives include, but are not limited to, a metal containing acrylic resin. The metal containing acrylic resin can include various substances, for example, inorganic compounds, metal-containing organic compounds and metal-free organic compounds. Illustrative examples of various substances which can be included in a metal containing acrylic resin include, but are not limited to, cuprous oxide, manganese ethylenebisdithiocarbamate, zinc dimethylcarbamate, 2-methylthio-4-t-butylamino-6-cyclopropylamino-s-triazine, 2,4,6-tetrachloroisophthalonirile, N,N-dimethyldicholorophenylurea, zinc ethylenebisdithiocarbamate, copper rhodanate, 4,5-dichloro-2-n-octyl-3 (2H)-isothiazolone, N-(fluorodichloromethylthio)phthalimide, N,N'-dimethyl-N'-phenyl-(N-fluorodichloromethylthio)

sulfamide, 2-pyridinethiol-1-oxide zinc salt and copper salt, tetramethylthiuram disulfide, 2,4,6-trichlorophenylmaleimide, 2,3,5,6-tetrachloro-4-(methylsulfonyl)pyridine, 3-iodo-2-propylbutyl carbamate, diiodomethyl-p-tolyl sulfone, phenyl(bispyridyl)bismuth dichloride, 2-(4-thiazolyl)-benzimidazole, triphenylboron pyridine salt and so forth.

In one or more embodiments, suitable exemplary antifouling additives include, but are not limited to, one or more geometrical isomers of an acrylonitrile compound, an acylonitrile salt, or mixtures thereof.

In one or more embodiments, suitable exemplary antifouling additives include, but are not limited to, one or more *capsicum* derivatives. Illustrative *capsicum* derivatives can include 8-methyl-N-vanillyl-6-nonenamide ("capsaicin"), N-(4-Hydroxy-3-methoxybenzyl)-8-methylnonanamide ("dihydrocapsaicin"), N-(4-Hydroxy-3-methoxybenzyl)-7-methyloctanamide ("nordihydrocapsaicin"), N-(4-Hydroxy-3-methoxybenzyl)-9-methyldecanamide ("homodihydrocapsaicin"), (3E)-N-(4-Hydroxy-3-methoxybenzyl)-9-methyldec-7-enamide ("homocapsaicin"), and N-(4-hydroxy-3-methoxy-benzyl)nonanamide ("nonivamide"). Illustrative derivatives of capsaicin can include cayenne pepper and oleoresin *capsicum*. In one or more embodiments, the *capsicum* derivatives can be mixed or otherwise combined with other antifouling additives.

Suitable exemplary antifouling additives include, but are not limited to, silver acetate and silver citrate; quaternary amine compounds, such as cetrimide; isoniazid; benzalkonium chloride; sulfa-based antimocrobial compounds such as sulfanilamide, sulfaguanidine, sulfathiazole, sulfacetamide, sulfabenzamide and sulfamethiazole; cholesterol; saponins, and sapotoxins. Suitable antifouling additives are commercially available from BASF Corporation of Florham Park, N.J. under the trade name Irgarol®.

Suitable exemplary antifouling additives include, but are not limited to, a bio-jelly. Bio-jelly growth can be promoted by compounds which can include 1,8-cineole, benzylidene aniline derivatives and compounds having styrene or cinnamolyl groups.

Illustrative examples of bio-jelly producing additives can be 4'-ethylbenzylidene-4-ethyl aniline, 2'-isopropylbenzylidene-4-butoxyaniline, 4-nonyl benzylideneaniline, 4'-stearylbenzylidene-4-butoxyaniline, benzylidene-4-nonyloxyaniline, 4'-ethylbenzylidene-4-hexylaniline, 4'-ethoxybenzylidene-4-n-octylaniline, 2'-butoxybenzylidene-2-ethylaniline, 4'-naphthyloxy benzylidene aniline, 4'-ethylbenzylidene-4-nitroaniline, 3',4'-diethylbenzylidene-4-butylaniline, terephthalidene-di-4-butoxyaniline, di-4-butoxybenzylidene-p-phenylenediamine, benzylidene-4-n-octylaniline, 4'-nonylbenzylidene-4-methoxyaniline, 4'-ethylhexylbenzylideneaniline, 4',4-oleyloxybenzylideneaniline, 2'-ethoxy-4'-bromobenzylideneaniline, 4'-hexylbenzylidene-4-octoxyaniline, 4'-nonyloxybenzylidene-4-nonylaniline, 4'-nonylbenzylidene-2-butoxyaniline, benzylideneoctylamine, butylideneaniline, octylidene-4-hexylaniline, octylidene-4-octylaniline, cinnamilideneaniline and cinnamilideneoctylamine, benzylidene aniline, benzylidene-4-chloroaniline, benzylidene-4-bromoaniline, benzylidene-4-nitroaniline, benzylidene-4-hydroxyaniline, 4'-methylbenzylideneaniline, 4'-chloro benzylideneaniline, 2'-hydroxybenzylideneaniline, 2-methylpyridine, 4-ethylpyridine, 4-hexylpyridine, 4-octylpyridine, 4-nonylpyridine, 4-decylpyridine, 4-laurylpyridine, aniline, 4-ethylaniline, 4-hexylaniline, 4-octylaniline, 4-nonylaniline, 4-decylaniline, 4-dodecylaniline, 4-ethylnitrobenzene, 4-octyl benzenesulfonic acid, 4-ethylbenzenesulfonic acid, 4-hexylnitrobenzene, 4-octylbenzaldehyde, 4-nonylbenzaldehyde, 4-ethylbenzenesulfonic acid, 2-octylbenzoic acid, 4-hexyloxy aniline, 4-nonyloxypyridine, 4-hexyl-2-chloro aniline, 4-ethoxy-2-chloroaniline, 4-nonyloxyaniline, 4-decylbenzoic acid, 4-oleylaniline and 4-stearylaniline.

Suitable exemplary antifouling additives include, but are not limited to, a non-tin-containing, water-insoluble, organo or inorganic compound selected from the group consisting of heterocyclic compounds, aromatic compounds substituted with heteroatom substitutents, amino compounds, carbocyclic vinyl ether ketones, phospho compounds, polychlorinated carbocyclic and acyclic compounds, chlorinated carbocyclic carboxylates, copper (cupric) oleate, alkyl dimethyl benzene, 2,4-d,α-chlorocrotyl ester, 2,3-dichloro-2-methylpropionic acid sodium salt, diphenylacetrontrile, n-dodecyl thiocyanate, ethyl-N,N-dipropylthiolcarbamate, ethyl-N,N-diisobutyl thiolcarbamate, ethylenebis(dithiocarbamato) zinc, ferric dimethyl-dithiocarbamate, isobornyl thiocyanoacetate, manganese ethylenebisdithiocarbamate, disodium ethylene bisdithiocarbamate, s-propylbutylethyl-thiocarbamate, piperonyl-bis(2-[2'-n-butoxyethoxy]ethyl) acetal, piperonyl butoxide alpha[2-(2-n-butoxyethoxy)-ethoxy]-4,5-methylenedioxy 2-propyltoluene, piperonyl cyclonen, 3',4'-dichloropropionalide, ethylene-1,2-bis(thiocarbamoyldimethylthiocarbamoyldisulfide), 5,6,7,8-tetra-hydro-1-naphthyl methylcarbamate, 2-thiocyanoethyl dodecanoate, tetramethylthiuram disulfide, tert-butyl 4 (or 5)-chloro-2-methylcyclohexanecarboxylate, S-propyldipropylthiocarbamate, zinc ethylene bisdithiocarbamate, zinc dimethyldithiocarbamate, antimony tartrate, antimony potassium tartrate, boric acid, ammonium sulfamate, 4-allyl-2-methoxyphenol, 2,3-dichloro-1,4-napthoquinone, cetylpyridinium, chloride, diphenylamine, 2-chloro-N,N-diallylacetamide, cetyltrimethylammonium bromide, 2-isopropylamino-4-chloro-6-ethylamino triazine, dimethoxythiophosphate derivative of diphenyl sulfide, ethyl 4-chloro-alpha(4-chlorophenyl), alpha-hydroxy benzene acetate methyl, diethylamino, dimethoxythiophosphate derivative of pyrimidine, ethoxylated nonylphenol, unsymmetrical hydrazine derivative of succinic acid, allyl, methylhydroxy substituted cyclopententone ester of dimethylpropenyl cyclopropane carboxylic acid, 2,5-dichloro, 3-amino benzoic acid, cinnamic acid, 2-6-dichloro, 4-nitroaniline, dichloro, isopropenyl anilide, dodecylguanidine monoacetate, trichlorophenyl, acetic acid, diphenyl ether, chlorophenyl derivative of the isobutyric acid ester of hydroxyl-acetonitrile, trihydroxybenzoic acid, 3-indolacetic acid, 3,5-dichloro-N-(3,3-dimethylpropyne)benzamide, napthalene acetamide dimethylethylphenoxy-cyclohexyl-2-propynyl sulfite, o-phenylphenol, phthalic acid, chlorophenyl-isopropyl, propynyl carbamate, N-phenyl, N-butynyl chloroacetamide, amino, chloro, phenyl derivative of azacyclohexamine, N,N-diallyl-2-chloroacetamide, aminoacetic acid derivative of methylphosphonate, 3,5-dinitro, 4-N,N-dipropylamino benzene sulfonamide, 2-chloro-2-propenyl diethylcarbamodithioate, acrolein phenylhydrazone, ammonium saccharinate, 2-allyl-4-hydroxy-3-methyl-2-cyclopenten-1-one ester of 2,2-dimethyl-3-(2-methylpropenyl cyclopropanecarboxylic acid), 4-allyl-2-methoxyphenol o-(allyloxy) phenyl methylcarbamate, 2-(allylthio)-2-thiazoline, 1,2,3,4, 7,7-hexachloro-5,6-bis(chloromethyl)-2-norbornene, 4-ethylamino-6-isopropylamino-2-methylthio-1,3,5-triazine, 2-amino-3-chloro-1,4-napthoquinone, 3-amino-5-nitro-o-toluamide, 3-amino-1,2,4-triazole, 2-chloro-4-ethyl-amino-6-isopropylamino-S-triazine, 4-chloro-m-chlorocarbanilate, 6-chloropiperonyl chrysanthemumate, N-butyl-N-ethyl-α,α,α-trifluoro-2-6-dinitro-p-toluidine-, bis(p-chlorophenyl)-3-pyridine methanol, his (dialkylphosphinothioyl) disulfide, bis(4-hydroxyiminomethylpyridinum-1-methyl)ether dichloride, 2,4-bis(3-methoxylpropylamino)-6-methylthio-S-triazine bis(pentachloro-2,4-cyclopentadien-1-yl), N-(4-bromo-3-chlorophenyl)-N'-methoxy-N'-methyl urea, 5-(bromomethyl)-1,2,3,4,7,7-hexachloro-2-norbornene, S—(O,O-diisopropyl phosphorodithionate of N-(2-mercaptoethyl)benzenesulfonamide, benzamidooxy-acetic acid, 3-benzylideneamino-4-phenylthiazoline-2-thione, bis(p-chlorophenoxy)methane bis(4-chlorophenyl) disulfide, 1,1-bis (pochlorophenyl)ethane 1,1-bis(p-chlorphenyl)-ethanol, o,o-dimethyl-o-2,5-dichloro-4-bromophenylthionophosphate, O,O-dimethyl-2,2,2-trichloro-1-n-butyryloxyethyl phosphonate, N-butylacetanilide, 2-tert-butylamino-4-chloro-6-ethyl amino-5-triazine, 2-tert-butylamino-4-ethylamino-6-methylmercapto-S-triazine, 4-tert-butyl-2-chlorophenylmethyl methylphosphoramidite, o-(4-tert-butyl-2-chlorophenyl)o-methyl phosphoramidothionate, butyl 3,4-dihydro-2,2-dimethyl-4-oxo-1,2h-pyran-6-carboxylate, n-butyl-9-hydroxy-fluorene-(9)-carboxylate, 2-(p-tert-butylphenoxy) cyclohexyl 2-propynyl sulfite, 1-butyn-3-yl m-chlorophenyl-carbamate, N-trichloro-methylthio-4-cyclohexene-1,2-docarboximide, 1-napththyl n-methylcarbamate, S-[[(p-chlorophenyl)thiol]methyl]O,O-diethylphosphorodithioate, 2-chloro-N,N-diallyl-acetamide, 2-chloroallyl diethyl-dithiocarbamate, cetyldimethylethylammonium bromide, cetylpyridinium chloride, tetrachloro-p-benzoquinone, 2-chloro-4,6-bis(diethylamino)-s-triazine, p-chlorobenzyl p-chlorophenyl sulfide, 1,2,3,5,6,-7,8,8-octachloro-2,3,3a,4,7,7a-hexahydro-4,7-methanoindene, 1-(3-chlorallyl)-3,5,7-triaza-1-azoniaadamantane chloride, ethyl 4,4'-dichlorobenzylate, 5-chloro-2-benzothiazolethiol zinc salt, p-chlorobenzyl p-fluorophenyl sulfide, 1-chloro-N'-(3,4-dichlorophenyl) N,N-dimethylformamidine, 4-chloro-3,5-dimethyl phenoxy-ethanol, 1,4-dichloro-2,5-dimethoxybenzene, 1-(chloro-2-norbornyl)-3,3-dimethylurea, S-(p-chloro-α-phenylbenzyl) 0,0-diethyl phosphorodithioate, p-chlorophenyl ester of benzene-sulfonic acid, N-3-chlorophenyl-1-(isopropyl-carbamoyl-1)-ethyl carbamate, 3-(p-chlorophenyl)-5-methyl rhodanine, 4 (and 6)-chloro-2-phenylphenol sodium salt, p-chlorophenyl phenyl sulfone, 4-chlorophenyl 2,4,5-trichloro-phenylazosulfide, N-(5-chloro-5-thiazolyl)propionamide, 2-[4-chloro-o-tolyl)oxy] propionanilide, 2-chloro-1-(2,4,5-trichloro-phenyl) vinyl dimethyl phosphate, N'-(4-chlorophenoxy)phenyl N,N-dimethylurea, isopropyl N-(3-chlorophenyl) carbamate, copper 8-quinolinolate, 2-(2,4-dihydroxyphenyl)-1-cyclohexene-1-carboxylic acid-lactone O,O-diethylphosphorothioate, 2-chloro-4-dimethylamino-6-methylpyrimidine, 3-(2-cyclopenten-1-yl)-2-methyl-4-oxo-2-cyclopenten-1-yl chrysanthemunate, α-cyclohexyl-α-phenyl-3-pyridyl-methanol, hydrochloride, N'-cyclo-octyl-N,N-dimethylurea, 4'-dichlorocyclopropanecarboxanilide, 2,4-dichlorophenoxyacetic acid, 3,5-dimethyl-1,3,5,2H-tetrahydrothiadiazine-2-thione, tetra-hydro-3,5-dimethyl-2H-1,3,5-thiadiazine-2-thione, 4-(2,4-dichlorophenoxy) butyric acid, dimethyl 2,3,5,6-tetra-chloroterephthalate, decyltriphenylphosphonium-bromochlorotriphenylstannate, dehydroacetic acid (and its sodium salt), tris and bis(2,4-dichlorophenoxyethyl) phosphate, 2-methyl-thio-4-isopropylamino-6-methylamino-s-triazine, S-2,3-dichloroallyl N,N-diisopropyl thiolcarbamate, 1,3-diaza-2,4-cyclopentadiene, N,N-di-n-butyl-p-chlorobenzene-sulfonamide 3,6-dichloro-o-anisic acid, O-(2-chloro-4-nitrophenyl) O,O-dimethyl phosphorothioate, 2,6-dichlorobenzonitrile, 2,3-dichloro-1,4-naphthoquinone, 1,3-bis(1-hydroxy-2,2,2-trichloroethyl) urea, 3,4-dichlorobenzyl methylcarbamate (80%) mixture with 2,3-dichlorobenzyl methylcarbamate (20%), 1,1-dichloro-2,2-bis(p-ethylphenyl)ethane, 2,4-dichloro-6-(o-chloro-anilino)-s-triazine, N-(dichlorofluoromethylthio)-N'N'-dimethyl-n-phenyl sulfamide, 4,4'-dichloro-N-methylbenzene-sulfoanilide, 2,6-dichloro-4-nitroaniline, 2,5-dichloro-3-nitrobenzoic acid, 5,2'-dichloro-4'-nitro-salicylanilide ethanolamine salt, 2',5'-dichloro-4'-nitrososalicylanilide, 2,2'-dihydroxy-5,5'-dichlorophenyl-methane, 1-(2,4-dichlorophenoxyacetyl)-3,5-dimethylpyrazole, N-3,4-dichlorophenyl N'-5-chloro-2-(2-sodium sulfonyl-4-chlorophenoxy)phenyl urea, 2,4-dichlorophenyl ester of benzene sulfonic acid, 2,4-dichlorophenyl methanesulfonate, 2,4-dichlorophenyl 4-nitrophenyl ether 4-dichlorotetrahydrothiophene 1,1-dioxide, 4,4'-dichloro-alpha-trichloromethylbenzhydrol, 3',4'-dichloro-2-methacrylanilide (Diethoxyphosphinothioylthio) gamma-butyrolactone, O,O-diethyl s-carboethoxymethyl phosphorothioate, O,O-diethyl O-naphthylamido phosphorothioate, O,O-diethyl O-3,5,6-trichloro-2-pyridyl phosphorothioate, 2,2'-dihydroxy-3,5,3',5',4"-pentachlorotriphenyl-methane 2"-sodium sulfonate, O,O-diisopropyl s-diethyldithiocarbamoyl phosphorodithioate, 2,4-dimethylbenzyl 2,2-dimethyl-3-(2-methylpropenyl)cyclopropanecarboxylate, O,O-dimethyl-S-2-(acetylamino)-ethyl dithiophosphate, N-dimethylamino succinamic acid, 1,1-dimethyl-3-[3-(n-tert-butyl-carbamoyloxy)phenyl]urea, O,O-dimethyl s-carboethoxymethyl phosphorothioate, O,O-dimethyl O-(3-chloro-4-nitrophenyl) phosphorothioate, O,O-dimethyl-o-p-cyanophenyl phosphorothioate, o,o-dimethyl-s-[5-ethoxy-1,3,4-thiadiazol-2(3H)-onyl-(3)-methyl] phosphoro-dithioate, N,N-dimethyl-N'-(2-methyl-4-chlorophenyl)-formamidine hydrochloride, O,O-dimethyl o-(4-nitro-m-tolyl) phosphorothioate, o,s-dimethyl tetrachloro thiotere-phthalate, 4'-dimethyltriazenoacetanilide, dinitrocyclohexylphenol, 2,4'-dinitro-4-trifluoromethyl diphenylether, 2-(1-methyl-n-heptyl)-4,6-dinitrophenyl crotonate, N,N-dimethyl-2,2-diphenylacetamide, diphenylamine, 2,6-dinitro-N,N-di-n-propyl-p-toluidine, di-n-propyl-2,5-pyridine-dicarboxylate, 1,1'-ethylene-2,2'-dipyridinium dibromide, 2,3-dicyano-1,4-dithia-anthraquinone, 3-(3,4-dichlorphenyl)-1,1-dimethyl-urea, n-dodecylguanidine acetate, 2-(2,4,5-trichlorophenoxy)ethyl-2,2-dichloropropionate, ethoxymethylbis(p-chlorophenyl) carbinol, 1,2-dihydro-6-ethoxy-2,2,4-trimethylquinone, 3-phenyl-1,1-dimethylurea trichloroacetate, O,O-dimethyl S—(N-formyl-N-methylcarbamoyl-methyl)phosphorodithioate, 2-formyl-4-chlorophenoxyacetic acid, 3-furfuryl-2-methyl-4-oxo-2-cyclopenten-1-yl chrysanthemunate, 2-heptadecyl-2-imidazoline, 7-chloro-4,6-dimethoxycoumaran-3-one-2-spiro-1'-(2'-methoxy-6'-methylcycl-ohex-2'-en-4'-one), 1,1,1,3,3,3,-hexachloro-2-propanone, 1,5a,6,9,9a,9b-hexahydro-4-a(4H)-dibenzofuran-carboxaldehyde, 9-(p-n-hexyloxyphenyl)-10-methyl-acridinium chloride, 2-hydroxymethyl-4-chloro-phenoxyacetic acid, N-hydroxymethyl-2,6-dichlorothiobenzamide, Isopropyl N-phenylcarbamate, isobutyl triphenylmethylamine, 5-bromo-3-isopropyl-6-methyluracil, isopropyl-4,4'-diboromobenzilate, isopropyl 4,4'-dichlorobenzilate, isorpropyl mercaptophenyl-acetate, O,O-dimethyl phosphorodithioate, 3-cyclohexyl-6,7-dihydro-1H-cyclopentapyrimidine-2,4(3H,5H)-dione, 3-(3,4-dichlorophenyl)-1-methoxy-1-methylurea, S-[1,2-bis(ethoxy-carbonyl)ethyl]O,O-dimethyl phosphorodithioate, 4-chloro-2-methylphenoxyacetic acid, 2-(4-chloro-2-methylphenoxy) propionic acid, sec-butyl 4 (or 5)-chloro-2-methylcyclohexanecarboxylate, s-[(4,6-diamino-s-triazine-2-yl)methyl]O,O-dimethyl phosphorodithioate, 2-isopropylamino-4-(3-methoxypropylamino)-6- methylthio-s-triazine, 1,1,1-trichloro-2,2-bis(p-methoxyphenyl)ethane, 2-methoxy-4-isopropylamino-6-diethylamino-s-triazine, S—(N-methoxymethylcarbamoylmethyl) dimethyl phosphorothiolothiononate, alpha-methylbenzyl 3-(dimethoxy-phosphinyloxy)-cis-crotonate, m-(1-methyl butyl) phenyl methyl-carbamate, methyl-2-chloro-9-hydroxyfluorene-(9)-carboxylate, 3,3'-methylenebis(4-hydroxycoumarin), 2,2'-methylenebis(3,4,6-trichlorophenol), 6-methyl-2-oxo-1,3-dithio(4,5-b) quinoxaline, O,O-dimethyl S-(2,5-dichlorophenyl-thio)-methyl phosphorodithioate, 3(2-methylpiperidino)propyl-3, 4-dichlorobenzoate, 4-(methyl sulfonyl)-2,6-dinitro-n,n-dipropylaniline, methyl-2,3,5,6-tetrachloro-n-methoxy-n-methylterephthalamate, O-methyl O-(2,4,5-trichloro-phenyl) amidophosphorothiomate, 3-(p-bromophenyl)-1-methyl-1-methoxyurea, 1,2-dihydropyridazine-3,6-dione, 3,3'-ethylenebis-(tetrahydro-4,6-dimethyl-2H-1,3,5-thiadiazone-2-thione), S-ethyl hexahydro-1H-azepine-1-carbothioate, 3-(p-chlorphenyl)-1,1-dimethylurea, 3-(p-chlorophenyl)-1,1-dimethylurea trichloroacetate, 1,2-dibromo-2,2-dichloroethyl dimethyl phosphate, beta-naphthoxyacetic acid, 3-(3,4-dichlorophenyl)-1-methyl-1-n-butylurea, 3-(hexahydro-4,7-methanoindan-5-yl)-1,1-dimethylurea, N-1-naphthyl-phthalamic acid, p-chlorophenyl p-phenyl 4-chlorobenzenesulfonate, phenothiazine, ethyl mercapto-phenylacetate O,O-dimethyl-phosphorodithioate, n-phenyl-1-(ethylcarbamoyl-1) ethylcarbamate (d isomer), phosphoric acid, 2-chloro-1-(2,4,5-trichlorophenyl)vinyl dimethyl ester, 4-amino-3,5,6-trichloropicolinic acid, polychlorobenzoic acid, dimethylamine salt, 2,4-bis-(isopropylamino)-6-methoxy-s-triazine, 2-methyl-mercapto-4,6-bis(isopropylamino)-s-triazine, 2-chloro-n-isopropylacetanilide, 2-chloro-4,6-bis(isopropyl-amino)-s-triazine, di-n-propyl-3-methyl-6,7-methylenedioxy-1,2,3,4-tetra-hydronaphthalene-1,-2-dicarboxylate, 5-amino-4-chloro-2-phenyl-3(2H) pyridazinone, pyrethrin 1,8-quinolinol, dimethyl 2,4,5-trichlorophenyl phosphorothionate salicylanilide, 1-(3,4-methylene-dioxy-phenoxy)-3,6,9-trioxoundecane, sodium 2-(2,4-dichloro-phenoxy)ethyl sulfate, 1-(2-methyl-cyclohexyl)-3-phenylurea, 1-(2,4,5-trichlorophenoxy) propionic acid, N'-chlor-2-methyl-p-valerotoluidide, 1,2-methylenedioxy-4-[2-(octylsulfinyl)propyl]benzene, methyl 3,4-dichlorocarbanilate, 2,4,5-trichlorophenoxyacetic acid, trichlorobenzyl chloride, 2,2-bis(p-chlorophenyl)-1,1-dichloroethane, 3-tert-butyl-5-chloro-6-methyluracil, 2,6-di-tert-butyl-p-tolylmethylcarbamate 2,3,6,7-tetrachloro-4-a, 8a-epoxy-1,2,3,4,4a,8a-hexahydro-14-methanonaphthalene-5,8-dione N-(1,1,2,2-tetrachloro-ethyl-sulfenyl)-cis-4-cyclohexene-1,2-dicarboximide, 2,4,5,6-tetrachloroiso-phthalonitrile, 1,2,4,5-tetrachloro-3-nitrobenzene, p-chlorophenyl 2,4,5-trichlorophenyl sulfone, 3,4,5,6-tetrahydrophthalimidomethyl 2,2-dimethyl-3-(2-methylpropenyl)cyclopropanecarboxylate, O,O,O',O'-tetramethyl O,O'-thiodi-p-phenylene phosphorothioate, 1,3,6,8-tetranitrocarbazole, 2-(4-thiazolyl)benzimidazole, 2,2'-thiobis(4,6-dichlorophenol), 2,3-quinoxaline-dithiol cyclic trithiocarbonate, N-meta-tolyl phthalamic acid, S-2,3,3-trichloroallyl N,N-di-isopropyl-thiolcarbamate, O,O-dimethyl (1-hydroxy-2,2,2-trichloroethyl)phosphonate, 2,3,6-trichlorobenzoic acid, trichlorobenoic acid, dimethylamine salt, 4,5,7-trichlorobenzthiadiazole-2,1,3,2,3,6-trichlorobenzyloxypropanol, N-trichloromethylthio-benzothiazolone, N-trichloromethylthiobenzoxazolone, 2,2,2-trichloro-n-(pentachloro-phenyl)acetimidoyl chloride, 2-(2,4,5-trichlorophenoxy)ethyl sulfate, sodium salt, N,N'-N''-trichloro-2,4,6-triamine-1,3,5-triazine, 2-chloro-4-(diethylamino)-6-(ethylamino)-s-triazine, 3,5-dinitro-o-toluamide, and mixtures thereof.

Suitable antifouling additives include, but are not limited to, organometallic compounds commercially available from Clariant of Winchester, Va. under the trade name CESA®.

In various embodiments, the antifouling TPU composition includes one or more additives. Suitable additives for purposes of the instant disclosure include, but are not limited to, cross-linkers, chain-terminators, compatibilizers, processing additives, adhesion promoters, anti-oxidants, defoamers, flame retardants, anti-foaming agents, water scavengers, molecular sieves, fumed silicas, surfactants, ultraviolet light stabilizers, fillers, thixotropic agents, colorants, pigments, inert diluents, and combinations thereof. If included, the additives can be included in the antifouling TPU composition in various amounts.

Various embodiments of the antifouling TPU composition have a specific gravity of from about 0.9 to about 1.9, alternatively from about 0.9 to about 1.4, $g/cm^3$; a shore hardness from about 40A to about 83D, when tested in accordance with ASTM D 2240; and an elastic modulus of from about 2,000 to about 30,000 PSI and/or a tensile strength of about 2,000 to about 8,000 PSI, when tested in accordance with ASTM D-412.

Various embodiments of the antifouling composition have a surface energy of less than about 30, alternatively from about 15 to about 28, alternatively from about 18 to about 26, alternatively from about 18 to about 24, alternatively from about 19 to about 24, alternatively from about 20 to about 24, alternatively from about 22 to about 24, $mJ/m^2$ when tested in accordance with ASTM D7490 or other tests known in the art. Various surface topographies, as are described below, can be used to change, e.g. reduce, the surface energy of the antifouling TPU composition. Without being bound by theory, it is believed that the various embodiments of the antifouling TPU composition which are formed into the article having the surface topographies described below create "super hydrophobicity", which prevents biofouling.

In various preferred embodiments, the antifouling TPU composition includes a TPU, e.g. ELASTOLLAN® 1185A, and a silicone, e.g. a MB Siloxane Masterbatch. In such embodiments, the TPU may be present in the antifouling TPU composition in an amount of from about 50 to about 98, alternatively from about 75 to about 95, alternatively from about 85 to about 95, parts by weight per 100 parts by weight of the antifouling TPU composition; and the silicone is present in an amount of from about 2 to about 50, alternatively from about 6 to about 25, alternatively from about 5 to about 15, parts by weight per 100 parts by weight of the antifouling TPU composition. Of course, these embodiments can further include additional components (other TPUs, antifouling additives, additives, etc.) described above. However, various embodiments of the antifouling TPU composition may consist of or consist essentially of the TPU and the silicone. As used herein, "consisting essentially of" is meant to exclude any element or combination of elements, as well as any amount of any element or combination of elements, that would alter the basic and novel characteristics of the antifouling TPU composition.

In various preferred embodiments, said antifouling TPU composition comprises a thermoplastic polyurethane and an organometallic antifouling additive. For example, in such embodiments, the antifouling TPU composition could include a TPU, e.g. ELASTOLLAN® 1185A, and an antifouling additive, e.g. zinc pyrithione. In such embodiments, the TPU may be present in the antifouling TPU composition in an amount of from about 50 to about 99.9, alternatively from about 95 to about 99.9, alternatively from about 95 to about 99.9, alternatively from about 98 to about 99.9, alternatively from about 99 to about 99.8, parts by weight per 100 parts by weight of the antifouling TPU composition; and the antifouling additive is present in an amount of from about 0.1 to about 10, alternatively from about 0.1 to about 5, alternatively from about 0.1 to about 2, alternatively from about 0.1 to about 1, parts by weight per 100 parts by weight of the antifouling TPU composition. Of course, these embodiments can further include additional components (other TPUs, additives, etc.) described above. For example, the antifouling TPU composition can further comprise silicone and/or a halogenated polymer. As another example, the antifouling TPU composition can further comprise a filler.

However, various embodiments of the antifouling TPU composition may consist of or consist essentially of the TPU and the antifouling additive. As used herein, "consisting essentially of" is meant to exclude any element or combination of elements, as well as any amount of any element or combination of elements, that would alter the basic and novel characteristics of the antifouling TPU composition.

In various other preferred embodiments, the antifouling TPU composition includes a TPU comprising the reaction product (typically a polycondensation reaction product) of a polyol such as polyTHF, e.g. polyTHF® 1000; a silicone, e.g. XIAMETER® 156; a chain extender, e.g. 1,4 butanediol; and an isocyanate, e.g. LUPRANATE® M20. In such embodiments, the TPU may be formed by reacting the polyol in an amount of from about 20 to about 80, alternatively from about 40 to about 60, parts by weight per 100 parts by weight of the components used to form the TPU; the silicone in an amount of from about 2 to about 25, alternatively from about 5 to about 15, parts by weight per 100 parts by weight of the components used to form the TPU; the chain extender in an amount of up to about 20, alternatively from about 2 to about 15, parts by weight per 100 parts by weight of the components used to form the TPU; and the isocyanate in an amount of from about 5 to about 60, alternatively from about 10 to about 50, parts by weight per 100 parts by weight of the components used to form the TPU. Of course, these embodiments can further include additional components (TPUs, antifouling additives, additives, etc.) described above. However, various embodiments of the antifouling TPU composition may consist of or consist essentially of the TPU described above. As used herein, "consisting essentially of" is meant to exclude any element or combination of elements, as well as any amount of any element or combination of elements, that would alter the basic and novel characteristics of the antifouling TPU composition.

The antifouling TPU composition may be substantially free from other polymers known in the art (including polyamide), fillers known in the art (including reinforcing fillers), and plasticizers known in the art. The terminology "substantially free," as used immediately above, refers to an amount of less than 0.1, more typically of less than 0.01, and most typically of less than 0.001, parts by weight per 100 parts by weight of the polyamide composition.

In addition to the antifouling TPU composition, the instant disclosure also provides a method of forming the antifouling TPU composition. The method of forming the antifouling TPU composition includes the step of combining the TPU, the polysiloxane (if included), and any other components described above to form the antifouling TPU composition. The step of combining may occur through any method known in the art including, but not limited to, direct extrusion, belt extrusion, reaction extrusion, reaction injection molding, vertical mixing, horizontal mixing, feed mixing, and combinations thereof. In one embodiment, the step of combining is further defined as feeding the TPU and other components into a compounding device such as a single or twin-screw extruder.

The method of forming the antifouling TPU composition may also include the step of heating the antifouling TPU composition (or component thereof) while in the compounding device, outside of the compounding device, or both outside of the compounding device and in the compounding device.

Subsequent to the step of combining, the method of forming the antifouling TPU composition may also include the step of pelletizing, dicing, or granulating the antifouling TPU composition. For example, the compounded antifouling TPU composition may be pelletized with an underwater pelletizer or a strand pelletizer.

In one embodiment, after formation of the antifouling TPU composition in the compounding device, the antifouling TPU composition is extruded on a twin-screw extruder and pelletized, diced, or granulated upon discharge.

The instant disclosure also provides an article 10 which is formed from the antifouling TPU composition and is resistant to biofouling. For example, one such article 10 is underwater cable sheathings/jackets which are formed from the antifouling TPU composition. However, the article 10 is not limited to underwater cable sheathings/jackets. That is, the article 10 may be any article known in the art which is succeptable to biofouling including, but not limited to, underwater cable sheathings/jackets, vessels, bouys, underwater cables and lines, structures (e.g. bridges, piers, and docks), power generating facilities and the components thereof, cosmetic implants, artificial heart valves, and synthetic joints which are inserted in a human body, wire and cable jacketing, conveyor belts, sporting goods including rafts and other flotation devices, appliances and furniture, animal collars and tags, etc.

The article 10 includes a body formed from the antifouling TPU composition described above. In various embodiments, the article 10 has a surface 12 with a 3-dimensional surface topography. The 3-dimensional surface topography can be imparted on the article 10, via extrusion, injection molding, pressing, embossing, and other techniques known in the art.

In one embodiment, as is described previously, the article 10 which is resistant to adhesion of organisms includes an antifouling thermoplastic polyurethane (TPU) composition comprising the reaction product of: (A) the polyetherol; (B) the silicone polyol; (C) the chain extender different than said polyetherol and said silicone polyol; and (D) the isocyanate has the surface 12 with a 3-dimensional surface topography.

In another embodiment, as is described previously, the article 10 which is resistant to adhesion of organisms includes an antifouling thermoplastic elastomer (TPU) composition comprising a thermoplastic polyurethane and an organometallic antifouling additive, e.g. zinc pyrithione.

As set forth above, the surface topography can be used to change, e.g. reduce, the surface energy of the antifouling TPU composition. In some embodiments, the surface topography of the article 10 reduces the surface energy over that of the article 10 having a flat surface topography by from about 1 to about 70, alternatively from about 5 to about 50, alternatively from about 10 to about 25, %. That is, the 3-dimensional surface 12 comprising the antifouling TPU composition has a surface energy which is from about 1 to about 70% less than the surface energy of a flat surface formed from the antifouling TPU composition.

For example, the article 10 formed from a specific embodiment of the antifouling TPU composition having a flat surface may have a surface energy of about 32 mJ/m², while the article 10 formed from the same specific embodiment of the antifouling TPU composition having a surface topography defining a plurality of continuous parallel ridges 14 may have a surface energy of about 23 mJ/m²—the 3-dimensional surface pattern reducing the surface energy of the article 10 by 28%.

Figure 11:
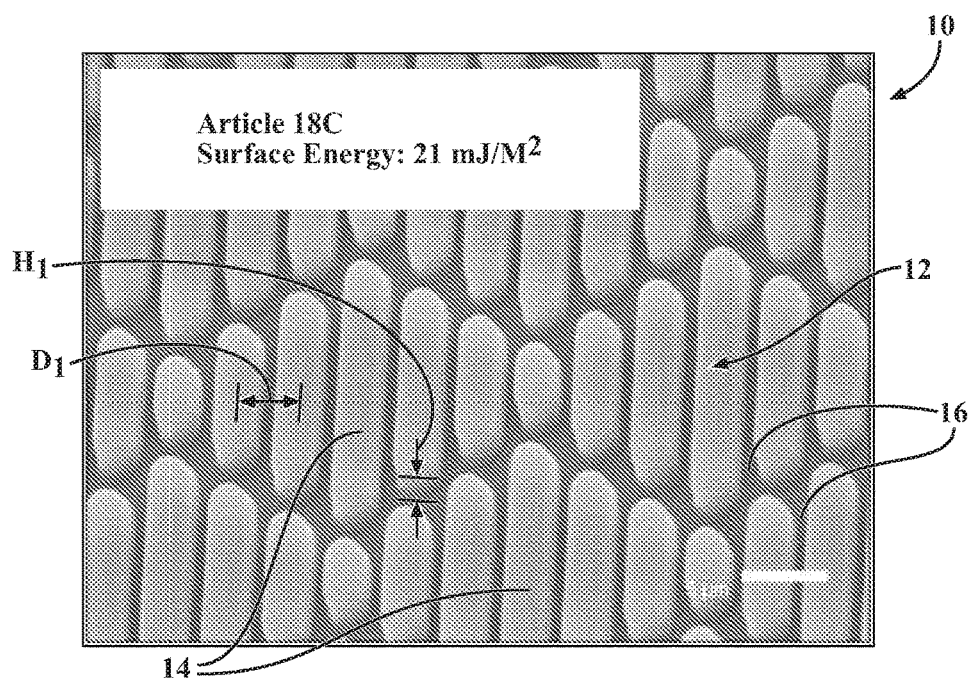
FIG. 11 is a perspective top view of a surface topography of a surface of Article 18C which is resistant to biofouling, said article formed from an antifouling composition.

In various embodiments, the article 10 has the surface 12 with the 3-dimensional surface topography defining the plurality of continuous parallel or patterned ridges 14 (crossing, wave-like, and other patterns), with each ridge 14 having a height ($H_1$) of from about 0.3 to about 150, alternatively from about 0.3 to about 10, m and a spacing ($D_1$) of from about 0.3 to about 150, alternatively from about 0.2 to about 10, m from one another to define valleys 16 between adjacent ridges, wherein said surface 12 has a surface energy of from about 15 to about 26, alternatively from about 18 to about 23, mJ/m². Height ($H_1$) of each ridge 14 as defined herein is the distance from a base of the ridge 14 to a peak of a ridge 14. Spacing ($D_1$) between ridges 14 is defined as the distance from a center of one ridge 14 to a center of an adjacent ridge 14. As is alluded to above, in some embodiments, the plurality of parallel ridges 14 comprises discontinuous ridges. For example, FIG. 11 shows the surface 12 having the plurality of parallel ridges 14 which are discontinuous. In other embodiments, the plurality of parallel ridges 14 comprises continuous ridges. For example, FIG. 12 shows the surface 12 having the plurality of parallel ridges 14 which are continuous.

Figure 12:
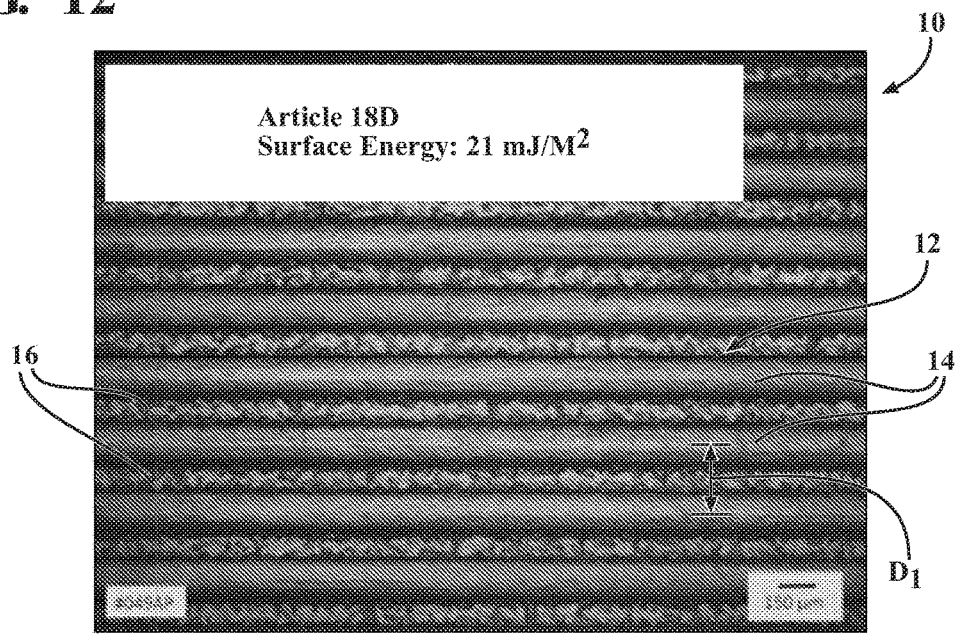
FIG. 12 is a perspective top view of a surface topography of a surface of Article 18D which is resistant to biofouling, said article formed from an antifouling composition.

For example, referring now to FIG. 12, in a preferred embodiment, the article 10 has the surface 12 with a surface topography defining the plurality of continuous parallel ridges 14 spaced from about 25 to about 100 m from one another. In various embodiments, the article 10 has the surface 12 with a surface topography defining the plurality of discontinuous parallel ridges 14 spaced from about 0.3 to about 150, alternatively from about 0.2 to about 10, m from one another to define valleys 16 between adjacent ridges, wherein said surface 12 has a surface energy of from about 15 to about 26, alternatively from about 18 to about 24, mJ/m². A cross-sectional profile of each ridge 14 can define any suitable configuration, such as a circle, an oval, or any type of ellipse, a closed parabolic shape, a quadrilateral, or any other type of polygon. For example, one configuration of the ridge 14 can have a first portion defining a parabolic surface and a second portion defining a planar surface to create a D-shaped cross-sectional profile. As another example, the ridge 14 can have a bulbous top portion and a flat planer surface forming an omega-like hourglass-shaped cross-sectional profile. As yet another example, the ridge 14 can have a polygonal configuration cross-sectional profile, e.g. a rectangular cross-sectional profile. For example, FIG. 11 shows the surface 12 having the plurality of parallel ridges 14 which are discontinuous and have a rectangular cross-sectional profile. As yet another example, the ridge 14 can have a semi-elliptical or a semi-circular cross-sectional profile. For example, FIG. 12 shows the surface 12 having the plurality of parallel ridges 14 which are continuous and have a semi-circular cross-sectional profile. Furthermore, a size of the cross-sectional profile, i.e., the size of the ridge 14, can vary.

In various embodiments, the article 10 has the surface 12 with a 3-dimensional surface topography defining a plurality of peaks 18, with each peak 18 having a height ($H_2$) of from about 0.3 to about 150, alternatively from about 0.1 to about 20, alternatively from about 0.2 to about 10 μm, and a spacing ($D_2$) of from about 0.3 to about 150, alternatively from about 0.1 to about 20, alternatively from about 0.2 to about 10, m from one another to define valleys 20 and arranged in patterns or random, wherein said surface 12 has a surface energy of from about 15 to about 26, alternatively from about 18 to about 24, mJ/m². Height ($H_2$) of each peak 18 as defined herein is the distance from a base of the peak 18 to an uppermost point (top) of the peak 18. Spacing ($D_2$) between peaks 18 is defined as the distance from a center of one peak 18 to a center of an adjacent peak 18. A cross-sectional profile of the peak 18 can define any suitable configuration, such as a circle, an oval, or any type of ellipse, a closed parabolic shape, a quadrilateral, or any other type of polygon. For example, one configuration of the peak 18 can have a rectangular cross-sectional profile. As another example, one configuration of the peak 18 can have a semi-elliptical or a semi-circular cross-sectional profile. Furthermore, a size of the cross-sectional profile, i.e., the size of the peak 18, can vary.

Figure 9:
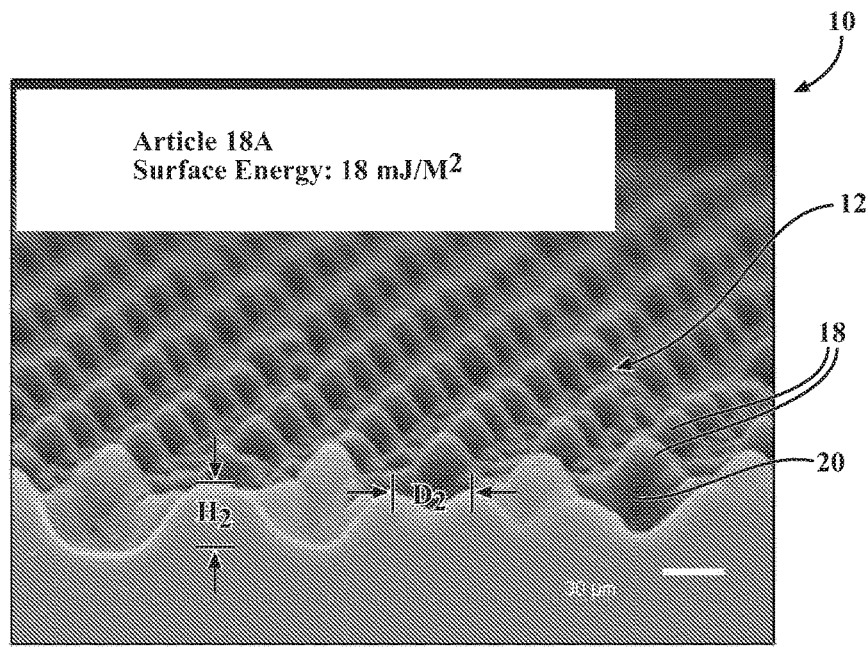
FIG. 9 is a perspective side view of a surface topography of a surface of Article 18A which is resistant to biofouling, said article formed from an antifouling composition.
Figure 10:
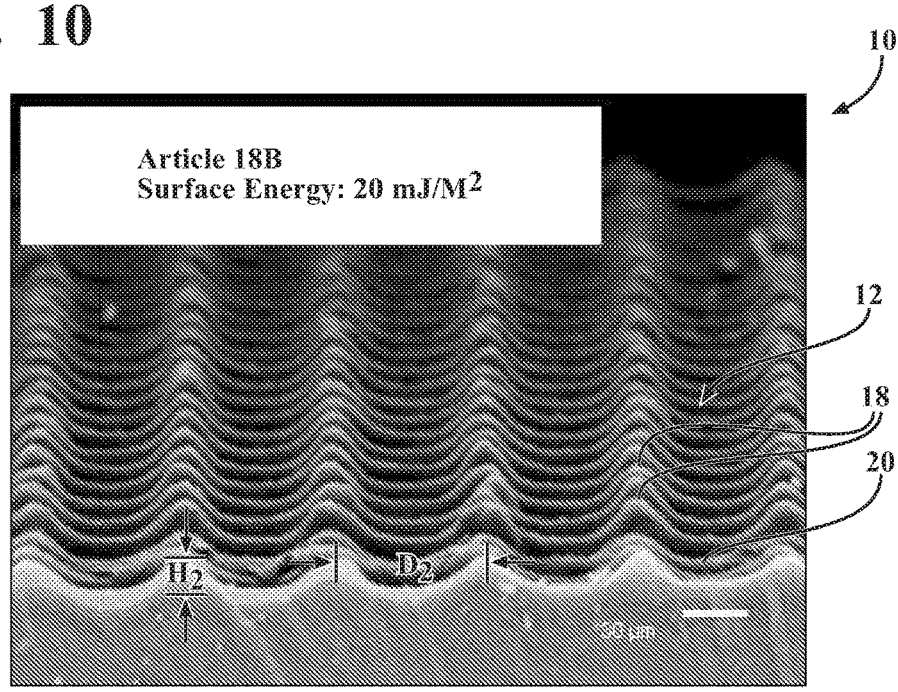
FIG. 10 is a perspective side view of a surface topography of a surface of Article 18B which is resistant to biofouling, said article formed from an antifouling composition.
Figure 13:
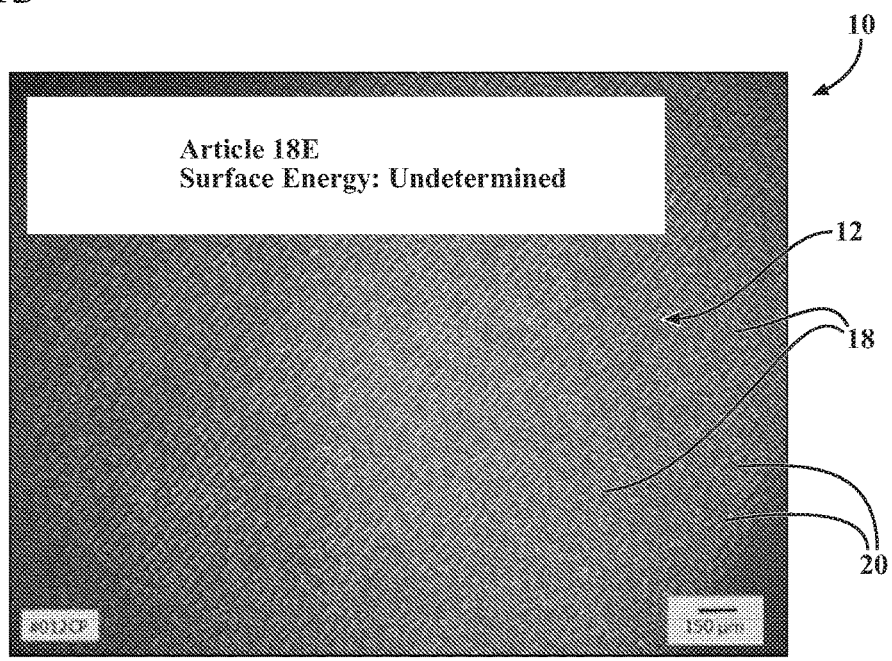
FIG. 13 is a perspective top view of a surface topography of a surface of Article 18E which is resistant to biofouling, said article formed from an antifouling composition.
Figure 14:
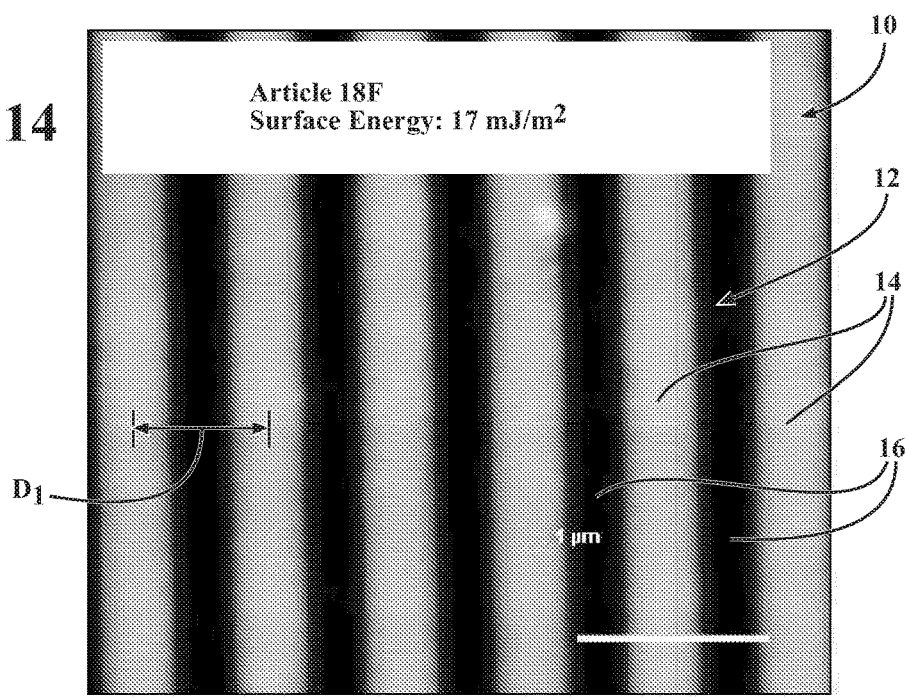
FIG. 14 is a perspective top view of a surface topography of a surface of Article 18F which is resistant to biofouling, said article formed from an antifouling composition.
Figure 15:
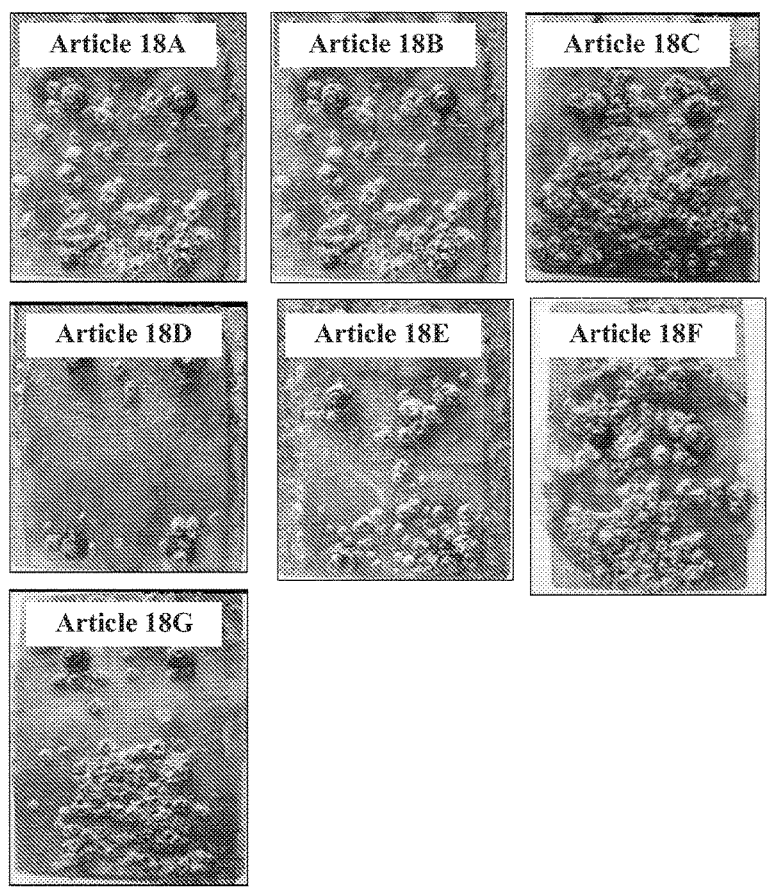
FIG. 15 is a perspective top view of the barnacle growth test results on the surfaces of Articles 18A-18F, as well as a perspective view of the barnacle growth test results on the smooth surface of Article 18G.

For example, referring now to FIG. 9, in one embodiment, the article 10 has the surface 12 with a 3-dimensional surface topography defining the plurality of peaks 18 having different heights ($H_2$) and valleys 20 which form a pattern. As another example, referring now to FIG. 10, in another embodiment, the article 10 has the surface 12 with a 3-dimensional surface topography defining the plurality of circular peaks 18 and valleys 20 which form a pattern. As another example, referring now to FIG. 13, in a preferred embodiment, the article 10 has the surface 12 with a 3-dimensional surface topography defining the plurality of peaks 18 and valleys 20 which form a pattern. The plurality of peaks 18 in FIG. 13 have a height of from about 0.1 to about 20, alternatively from about 0.2 to about 10, μm. In various embodiments, the article 10 formed from the antifouling TPU composition and having the surface topography can reduce the amount of barnacle fouling on surface areas by greater than about 20, alternatively greater than about 40, alternatively greater than about 60, alternatively greater than about 80, %.

Of course, it is to be understood that the aforementioned physical properties and dimensions are not limiting and only describe some embodiments of this disclosure. To this end, the present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

Examples

Examples 1-3 (antifouling TPU compositions 1-3) are formed according to the instant disclosure by compounding a thermoplastic polyurethane and a silicone on a single screw extruder (barrier screw variant). Once pelletized, the antifouling TPU compositions are injection molded into test plaques which have a smooth surface, i.e., are not patterned or embossed.

The test plaques are analyzed to determine the surface energy of the antifouling TPU compositions, the tensile properties (ASTM D412) of the antifouling TPU compositions, the abrasion properties (DIN ISO 4649) of the antifouling TPU composition, and the barnacle growth on the antifouling TPU compositions. "Static Immersion" barnacle growth field tests were conducted by Poseidon Sciences—Sacred Heart Marine Research Centre. FIG. 1 is a perspective view of the barnacle growth test results on the test plaque of Example 3.

Referring now to Table 1 below, the amount and type of each component used to form the antifouling TPU compositions of Examples 1-3 is indicated with all values in parts by weight based on 100 parts by weight of the total antifouling TPU composition. Still referring to Table 1 below, the various performance properties of antifouling TPU compositions of Examples 1-3 are also set forth.

TABLE 1

|  | Example 1 | Example 2 | Example 3 |
|---|---|---|---|
| TPU A | 94.0 | 87.5 | 75.0 |
| Silicone A | 6.0 | 12.5 | 25.0 |
| Surface Energy (mJ/m$^2$) | 20.0 | 21.2 | 22.1 |
| Peak Stress (psi) | 5760 | 5820 | 4110 |
| Elongation at Break (%) | 711 | 718 | 668 |
| Abrasion (mg) | 18 | 20 | 49 |
| Barnacle Growth (number of barnacles) | | | |
| Month 1 | Not Tested | Not Tested | 25 |
| Month 2 | | | 97 |
| Month 3 | | | 119 |
| Month 4 | | | 174 |

TPU A is a polyether-based aromatic TPU.

Silicone A is a high molecular weight polydimethylsiloxane.

The TPU/Silicone blends of Examples 1-3 are commercially available from Dow Corning Multibase.

In contrast to Examples 1-3 (antifouling TPU compositions 1-3) which comprise a mixture of TPU A and PDMS A, Examples 4 and 5 (antifouling TPU compositions 4 and 5) comprise a thermoplastic polyurethane and a wax compounded. Antifouling TPU compositions 4 and 5 are compounded on a single screw extruder (barrier screw variant). Once pelletized, the antifouling TPU compositions are injection molded into test plaques which have a smooth surface, i.e., are not patterned or embossed.

Figure 2:
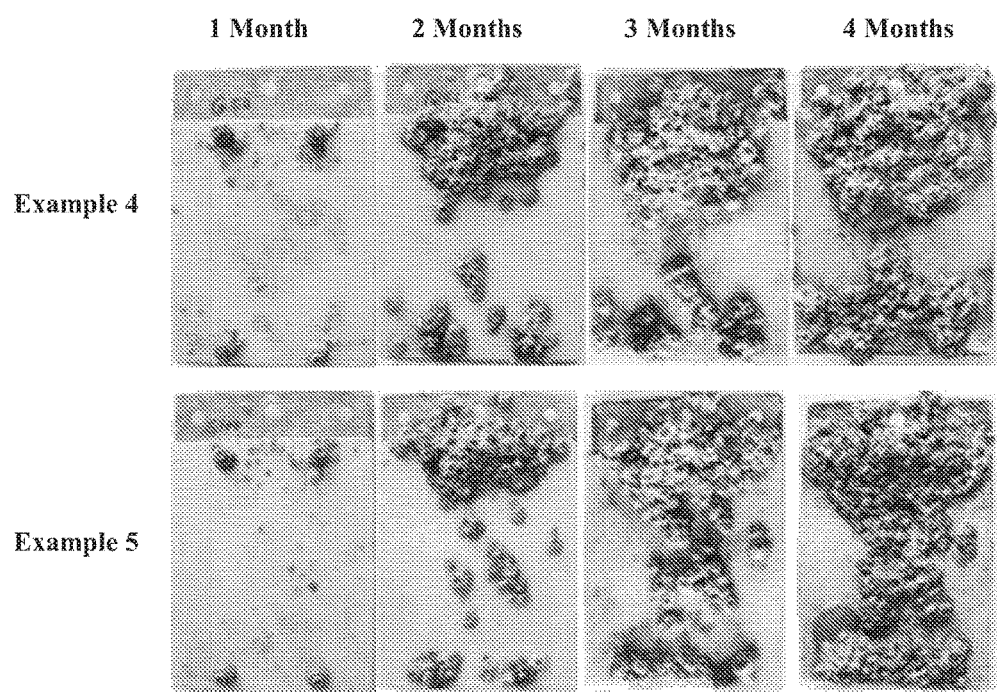
FIG. 2 is a perspective top view of the barnacle growth test results on the test plaques of Examples 4 and 5.

The test plaques are analyzed to determine the surface energy of the antifouling TPU compositions, the tensile properties (ASTM D412) of the antifouling TPU compositions, and the barnacle growth on the antifouling TPU compositions. "Static Immersion" barnacle growth field tests were conducted by Poseidon Sciences—Sacred Heart Marine Research Centre. FIG. 2 is a perspective view of the barnacle growth test results on the test plaques of Examples 4 and 5.

Referring now to Table 2 below, the amount and type of each component used to form the antifouling TPU compositions of Examples 4 and 5 is indicated with all values in parts by weight based on 100 parts by weight of the total antifouling TPU composition. Still referring to Table 2 below, the various performance properties of antifouling TPU compositions of Examples 4 and 5 are also set forth.

TABLE 2

|  | Example 4 | Example 5 |
|---|---|---|
| TPU B | 50 | 100 |
| Wax A | 50 | — |
| Surface Energy (mJ/m$^2$) | 17 | 16 |
| Peak Stress (psi) | 3240 | 3720 |
| Elongation at Break (%) | 352 | 394 |
| Abrasion (mg) | — | — |
| Barnacle Growth (number of barnacles) | | |
| Month 1 | 44 | 41 |
| Month 2 | 91 | 107 |
| Month 3 | 121 | 181 |
| Month 4 | 227 | 275 |

TPU B is a polyether-based aromatic TPU.

Wax A is an amide ester wax.

Examples 6a and 6b (antifouling TPU composition 6) comprise a thermoplastic polyurethane. Antifouling TPU composition 6 is compounded on a single screw extruder (barrier screw variant). Once pelletized, the antifouling TPU composition is injection molded into test plaques which have a smooth surface, i.e., are not patterned or embossed.

Figure 3:
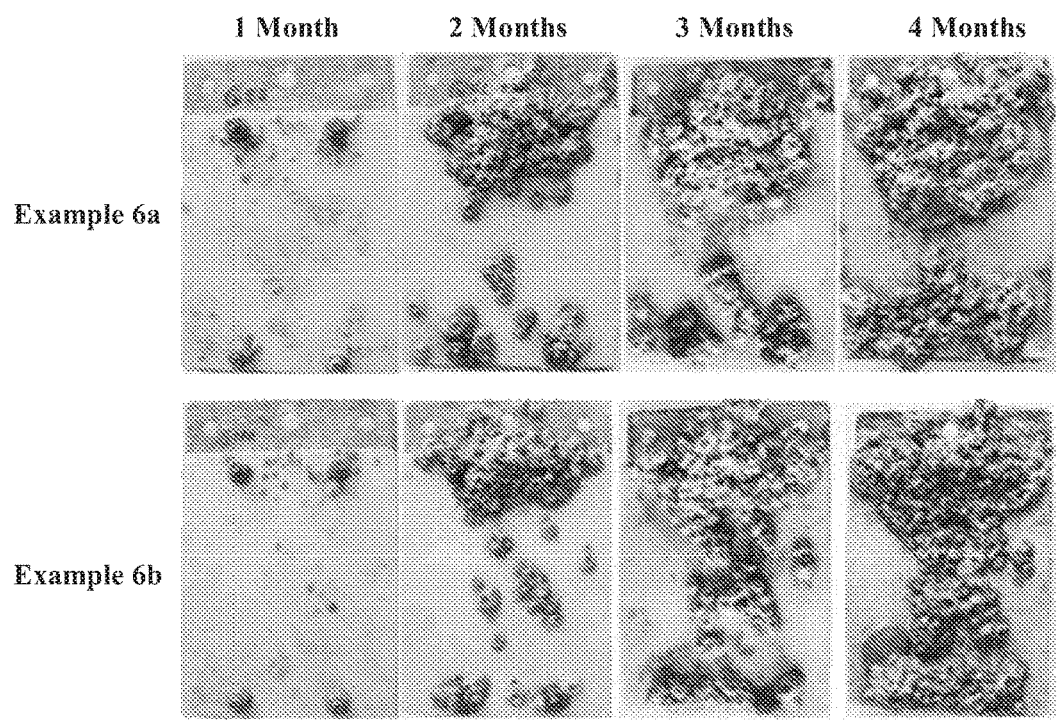
FIG. 3 is a perspective top view of the barnacle growth test results on the test plaques of Examples 6a and 6b.

The test plaques are analyzed to determine the surface energy of the antifouling TPU compositions, the tensile properties (ASTM D412) of the antifouling TPU compositions, and the barnacle growth on the antifouling TPU compositions. "Static Immersion" barnacle growth field tests were conducted by Poseidon Sciences—Sacred Heart Marine Research Centre. FIG. 3 is a perspective view of the barnacle growth test results on the test plaques of Examples 6a and 6b.

Referring now to Table 3 below, the amount and type of each component used to form the antifouling TPU compositions of Examples 6a and 6b is indicated with all values in parts by weight based on 100 parts by weight of the total antifouling TPU composition. Still referring to Table 3 below, the various performance properties of antifouling TPU compositions of Examples 6a and 6b are also set forth.

TABLE 3

|  | Example 6a | Example 6b |
|---|---|---|
| TPU A | 100 | 100 |
| Surface Topography | Smooth | Smooth |
| Surface Energy (mJ/m$^2$) | 19 | — |
| Peak Stress (psi) | 3620 | — |
| Elongation at Break (%) | 419 | — |
| Abrasion (mg) | — | — |
| Barnacle Growth (number of barnacles) | | |
| Month 1 | 37 | — |
| Month 2 | 246 | — |
| Month 3 | 281 | — |
| Month 4 | 388 | — |

TPU A is a polyether-based aromatic TPU.

Examples 7-9 (antifouling TPU compositions 7-9) comprise a fluorinated TPU, i.e., a TPU including fluorine. That is, the fluorine is included in the TPUs of 7-9. Examples 7-9 are formed according to the instant disclosure by compounding a polyTHF, a fluorine diol, a chain extender, and an isocyanate in a mixer. Immediately following compounding, the antifouling TPU composition of Examples 7-9 are pressed into test plaques which have a smooth surface, i.e., which are not patterned or embossed. The test plaques are analyzed to determine the surface energy of the antifouling TPU composition.

Figure 4:
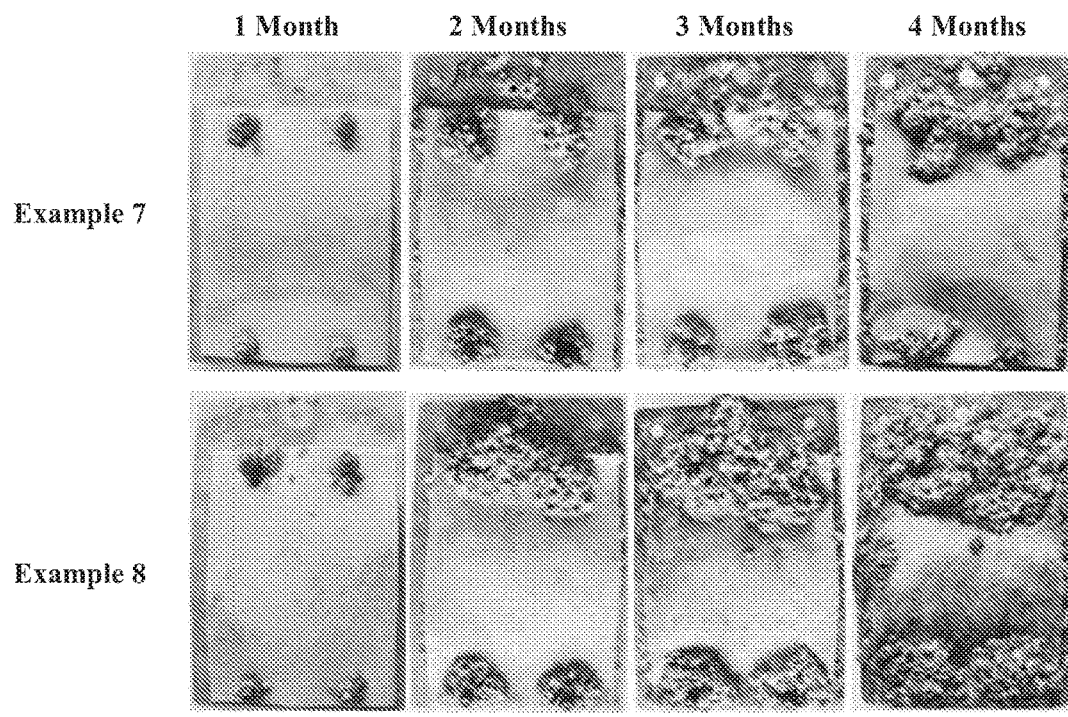
FIG. 4 is a perspective top view of the barnacle growth test results on the test plaques of Examples 7 and 8.

The test plaques are analyzed to determine the surface energy of the antifouling TPU compositions, and the barnacle growth on the antifouling TPU compositions. "Static Immersion" barnacle growth field tests were conducted by Poseidon Sciences—Sacred Heart Marine Research Centre. FIG. 4 is a perspective view of the barnacle growth test results on the test plaques of Examples 7 and 8.

Referring now to Table 4, the amount and type of each component used to form the antifouling TPU composition of Examples 7-9 is indicated with all values in parts by weight based on 100 parts by weight of the total antifouling TPU composition.

TABLE 4

|  | Example 7 | Example 8 | Example 9 |
| --- | --- | --- | --- |
| Polyol A | 57 | 54 | 49 |
| Polyol B | 2 | 5 | 10 |
| Chain Extender A | 7 | 7 | 7 |
| Isocyanate A | 34 | 34 | 34 |
| Surface Energy (mJ/m$^2$) | 22 | 16 | — |
| Barnacle Growth (number of barnacles) | | | |
| Month 1 | 8 | 76 | — |
| Month 2 | 39 | 110 | — |
| Month 3 | 70 | 111 | — |
| Month 4 | 64 | 180 | — |

Polyol A is polyTHF.
Polyol B is a dialcohol terminated, ethoxylated derivative of perfluoropolyether.
Chain Extender A is 1,4 butanediol.
Isocyanate A is 4,4'-diphenylmethane diisocyanate (MDI).

Examples 10-13 (antifouling TPU compositions 10-13) comprise a fluorinated TPU, i.e., a TPU including fluorine. That is, the fluorine is included in the TPUs of Examples 10-13. Examples 10-13 are formed according to the instant disclosure by compounding a polyTHF, a fluorine diol, a chain extender, and an isocyanate in a mixer. Immediately following compounding, the antifouling TPU composition of Examples 10-13 are pressed into test plaques which have a smooth surface, i.e., which are not patterned or embossed. The test plaques are analyzed to determine the surface energy of the antifouling TPU composition.

Figure 5:
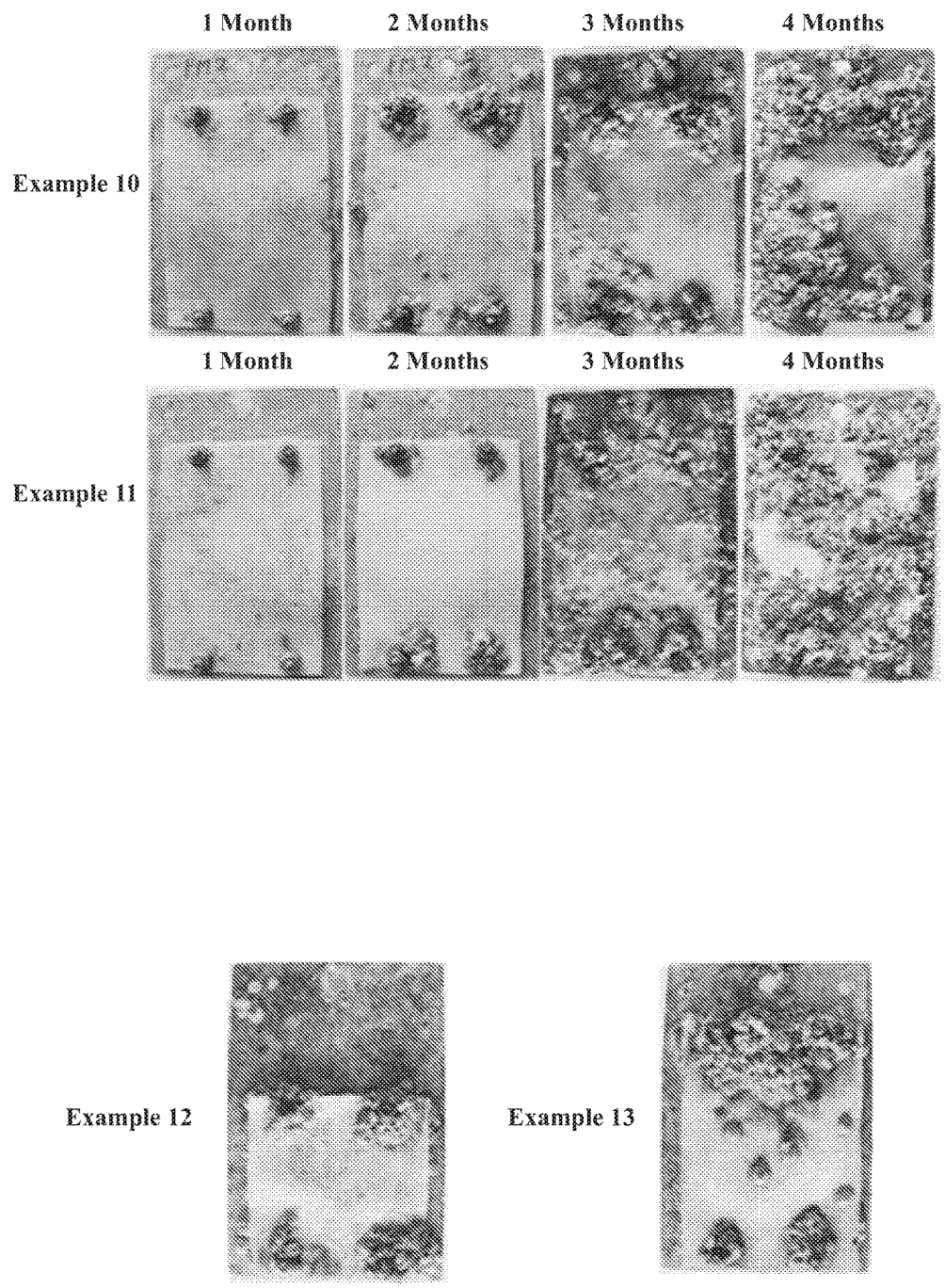
FIG. 5 is a perspective top view of the barnacle growth test results on the test plaques of Examples 10-13.

The test plaques are analyzed to determine the surface energy of the antifouling TPU compositions, and the barnacle growth on the antifouling TPU compositions. "Static Immersion" barnacle growth field tests were conducted by Poseidon Sciences—Sacred Heart Marine Research Centre. FIG. 5 is a perspective view of the barnacle growth test results on the test plaques of Examples 10-13.

Referring now to Table 5, the amount and type of each component used to form the antifouling TPU composition of Examples 10-13 is indicated with all values in parts by weight based on 100 parts by weight of the total antifouling TPU composition.

TABLE 5

|  | Example 10 | Example 11 | Example 12 | Example 13 |
| --- | --- | --- | --- | --- |
| Polyol A | 57 | 54 | 49 | — |
| Polyol C | 2 | 5 | 10 | 64 |
| Chain Extender A | 7 | 7 | 7 | 3 |
| Isocyanate A | 34 | 34 | 34 | 43 |
| Surface Energy (mJ/m$^2$) | 16 | 22 | 19 | 20 |
| Barnacle Growth (number of barnacles) | | | | |
| Month 1 | 8 | 76 | — | — |
| Month 2 | 39 | 110 | — | — |
| Month 3 | 70 | 111 | — | — |
| Month 4 | 64 | 180 | — | — |

Polyol A is polyTHF.
Polyol C is a hydroxy functional perfluoropolyether.
Chain Extender A is 1,4 butanediol.
Isocyanate A is 4,4'-diphenylmethane diisocyanate (MDI).

Examples 14 and 15 (antifouling TPU compositions 14 and 15) comprise a fluorinated TPU, i.e., a TPU including fluorine. That is, the fluorine is included in the TPUs of Examples 14 and 15. Examples 14 and 15 are formed according to the instant disclosure by compounding a polyTHF, a fluorine diol, a chain extender, and an isocyanate in a mixer. Immediately following compounding, the antifouling TPU composition of Examples 14 and 15 are pressed into test plaques which have a smooth surface, i.e., are not patterned or embossed. The test plaques are analyzed to determine the surface energy of the antifouling TPU composition.

Figure 6:
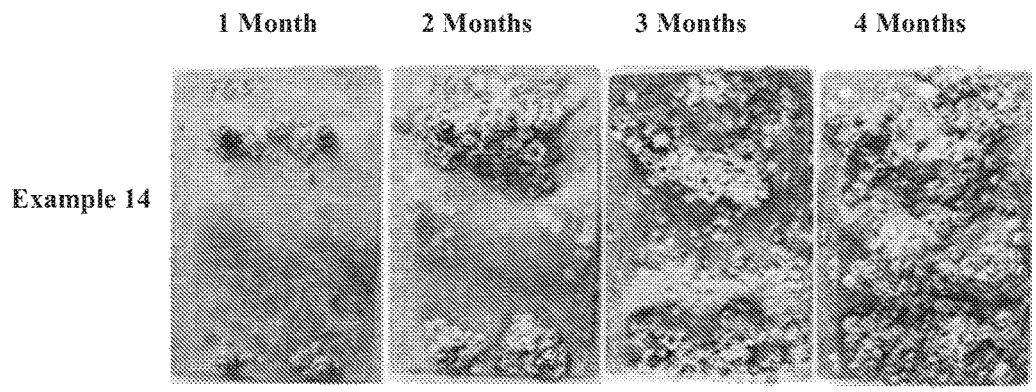
FIG. 6 is a perspective top view of the barnacle growth test results on the test plaques of Examples 14 and 15.
Figure 6:
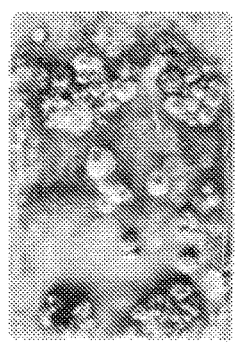

The test plaques are analyzed to determine the surface energy of the antifouling TPU compositions, and the barnacle growth on the antifouling TPU compositions. "Static Immersion" barnacle growth field tests were conducted by Poseidon Sciences—Sacred Heart Marine Research Centre. FIG. 6 is a perspective view of the barnacle growth test results on the test plaques of Examples 14 and 15.

Referring now to Table 6, the amount and type of each component used to form the antifouling TPU composition of Examples 14 and 15 is indicated with all values in parts by weight based on 100 parts by weight of the total antifouling TPU composition.

TABLE 6

|  | Example 14 | Example 15 |
| --- | --- | --- |
| Polyol A | 54 | 49 |
| Polyol D | 5 | 10 |
| Chain Extender A | 7 | 7 |
| Isocyanate A | 34 | 34 |
| Surface Energy (mJ/m$^2$) | 22 | 17 |
| Barnacle Growth (number of barnacles) | | |
| Month 1 | 68 | 27 |
| Month 2 | 119 | 48 |
| Month 3 | 186 | 64 |
| Month 4 | 400 | 72 |

Polyol A is polyTHF.
Polyol D is a fluoroinated polyTHF.
Chain Extender A is 1,4 butanediol.
Isocyanate A is 4,4'-diphenylmethane diisocyanate (MDI).

Examples 16 and 17 (antifouling TPU compositions 16 and 17) comprises a silicone TPU, i.e., a TPU including silicone. That is, the silicone is included in the TPU of Examples 16 and 17. Examples 16 and 17 are formed according to the instant disclosure by compounding a polyTHF, a silicone diol, a chain extender, and an isocyanate in a mixer. Immediately following compounding, the antifouling TPU composition of Examples 16 and 17 are pressed into test plaques which have a smooth surface, i.e., are not patterned or embossed.

Figure 7:
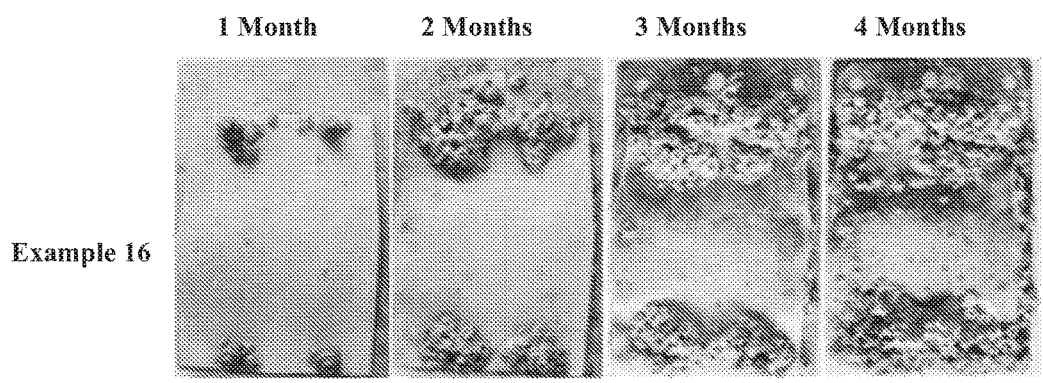
FIG. 7 is a perspective top view of the barnacle growth test results on the test plaques of Examples 16 and 17.
Figure 7:

The test plaques are analyzed to determine the surface energy of the antifouling TPU compositions, and the barnacle growth on the antifouling TPU compositions. "Static Immersion" barnacle growth field tests were conducted by Poseidon Sciences—Sacred Heart Marine Research Centre. FIG. 7 is a perspective view of the barnacle growth test results on the test plaques of Examples 16 and 17.

Referring now to Table 7, the amount and type of each component used to form the antifouling TPU composition of Examples 16 and 17 is indicated with all values in parts by weight based on 100 parts by weight of the total antifouling TPU composition.

TABLE 7

|  | Example 16 | Example 17 |
|---|---|---|
| Polyol A | 54 | 49 |
| Polyol E | 5 | 10 |
| Chain Extender A | 7 | 7 |
| Isocyanate A | 34 | 34 |
| Surface Energy (mJ/m$^2$) | — | — |
| Barnacle Growth (number of barnacles) | | |
| Month 1 | 29 | 30 |
| Month 2 | 89 | 102 |
| Month 3 | 101 | 117 |
| Month 4 | 141 | 195 |

Polyol A is polyTHF.
Polyol E is PDMS having hydroxyl end blocks, i.e., is a silicone diol.
Chain Extender A is 1,4 butanediol.
Isocyanate A is 4,4'-diphenylmethane diisocyanate (MDI).

Examples 18-20 (antifouling TPU compositions 18-20) comprise a mixture of a TPU and an antifouling additive.

Examples 18-20 are formed according to the instant disclosure by compounding the TPU and the antifouling additive. Immediately following compounding, the antifouling TPU compositions of Examples 18-20 are pressed into test plaques which have a smooth surface, i.e., are not patterned or embossed.

Figure 8:
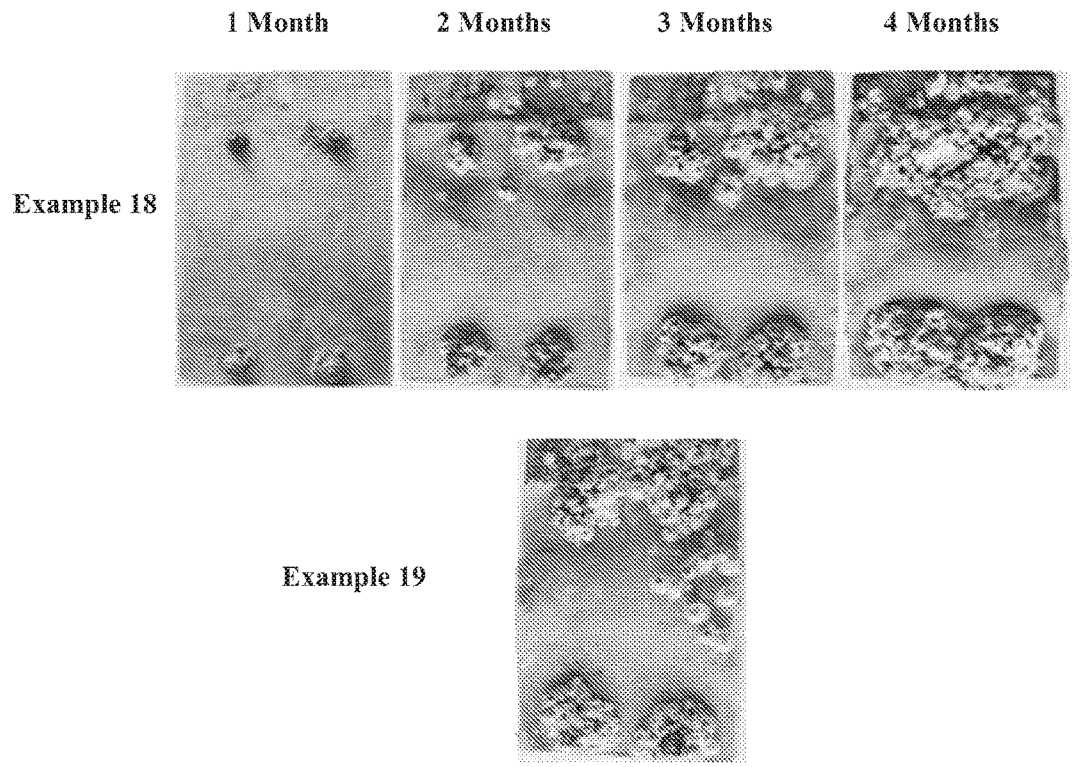
FIG. 8 is a perspective top view of the barnacle growth test results on the surfaces of the test plaques of Examples 18 and 19.

The test plaques are analyzed to determine the surface energy of the antifouling TPU compositions, and the barnacle growth on the antifouling TPU compositions. "Static Immersion" barnacle growth field tests were conducted by Poseidon Sciences—Sacred Heart Marine Research Centre. FIG. 8 is a perspective view of the barnacle growth test results on the surfaces of the test plaques of Examples 18 and 19.

Referring now to Table 8, the amount and type of each component used to form the antifouling TPU compositions of Examples 5-7 is indicated with all values in parts by weight based on 100 parts by weight of the total antifouling TPU composition.

TABLE 8

|  | Example 18 | Example 19 | Example 20 |
|---|---|---|---|
| TPU A | 99.8 | 99.5 | 99.0 |
| Antifouling Additive A | 0.2 | 0.5 | 1.0 |
| Surface Energy (mJ/m$^2$) | — | — | — |
| Peak Stress (psi) | 4130 | 3120 | — |
| Elongation at Break (%) | 649 | 619 | — |
| Abrasion (mg) | 32 | 13 | — |
| Barnacle Growth (number of barnacles) | | | |
| Month 1 | 32 | 13 | — |
| Month 2 | 153 | 131 | — |
| Month 3 | 81 | 211 | — |
| Month 4 | 240 | 192 | — |

TPU A is a polyether-based aromatic TPU.
Antifouling Additive A is an antifouling additive comprising zinc pyrithione.

Following compounding, the antifouling TPU composition of Example 18 is pressed into test plaques which have a variety of different surface topographies. Specifically, Articles 18A-18G are formed from the antifouling TPU composition of Example 18, with each article having a different surface topography. To form the different surface topographies, test plaques of the antifouling TPU composition of Example 18 are softened on heated press between Teflon sheets for 4-6 minutes under 70-100 kPa of pressure and at platen temperatures of 370-390° F. The test plaques are removed from the press, and the respective surface topography/pattern is pressed into the surface of the softened plaque with 4 lbs of pressure on room temperature plates. Referring now to FIGS. 9-14, a perspective view of each of the different surface topographies of Articles 18A-18F is illustrated. A general description of the surface topography, the surface energy, and the barnacle growth test results for each of Articles 18A-18F is set forth in Table 9 below.

TABLE 9

| Article ID | Surface Topography General Description | Surface Energy (mJ/m$^2$) | Barnacle Growth* (1-5) |
|---|---|---|---|
| Article 18A | Plurality of discontinuous parallel ridges spaced from 10 to 80 μm from one another; said parallel ridges formed from multiple peaks having varying heights. | 18 | 3 |
| Article 18B | Plurality of discontinuous parallel ridges spaced from 10 to 80 μm from one another; said parallel ridges formed from multiple peaks having uniform height. | 20 | 3 |
| Article 18C | Plurality of discontinuous parallel ridges spaced from 0.1 to 5 μm from one another; said parallel ridges formed from multiple segments of systematically varying length and uniform height. | 21 | 5 |
| Article 18D | Plurality of continuous parallel ridges spaced from 25 to 100 μm from one another. Pattern H049 - supplied by Hoowaki | 21 | 1 |
| Article 18E | Plurality of circular peaks which form a pattern. Pattern H012C - supplied by Hoowaki | — | 2 |

TABLE 9-continued

| Article ID | Surface Topography General Description | Surface Energy (mJ/m²) | Barnacle Growth* (1-5) |
|---|---|---|---|
| Article 18F | Plurality of continuous parallel ridges spaced from 0.1 to 1 μm from one another | 17 | 4 |
| Article 18G | Smooth | — | 4 |

*1 = little or no barnacle growth; 5 = significant barnacle growth.

Figure 16:
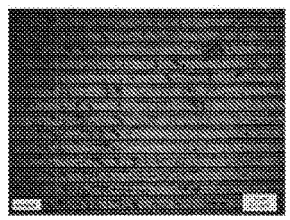
FIG. 16 is a perspective top view of abrasion test results on the surface of Article 18D, as well as a comparative article.
Figure 16:
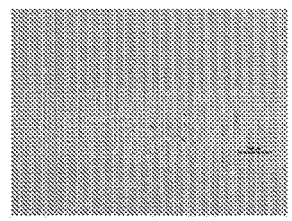
Figure 16:
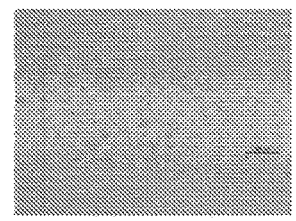
Figure 16:
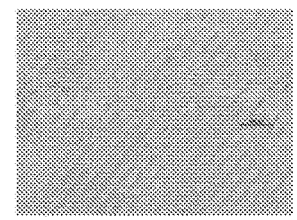
Figure 16:
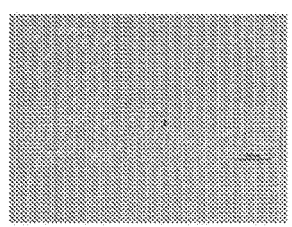
Figure 16:
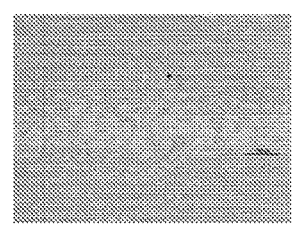
Figure 16:
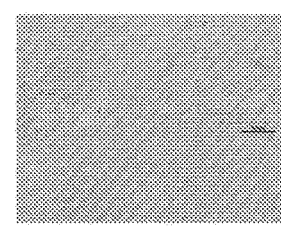
Figure 16:
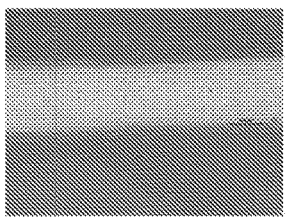
Figure 16:
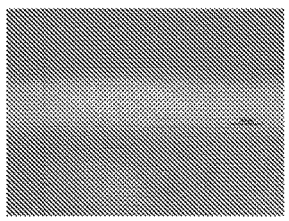

Referring now to FIG. 16, Article 18D is tested for durability. Specifically, Article 18D is tested for abrasion in accordance with DIN ISO 4649. More specifically, Article 18D is tested with a 7 mm diameter mar tip on a linear abrader. Abrasion testing consists of 300 cycles at 60 cycles/minute across a 2.5 inch travel distance; loads of 750 and 1000 g were used. Abrasion testing is repeated with abrasion perpendicular (see FIG. 16, left image), parallel (see FIG. 16, middle image), and diagonal (see FIG. 16, right image) to the direction of the surface topography/pattern. Testing was also conducted on an unpatterned article/plaque made from TPU A (a polyether-based aromatic—BASF Elastollan 1185A) for comparative purposes.

Figure 17:
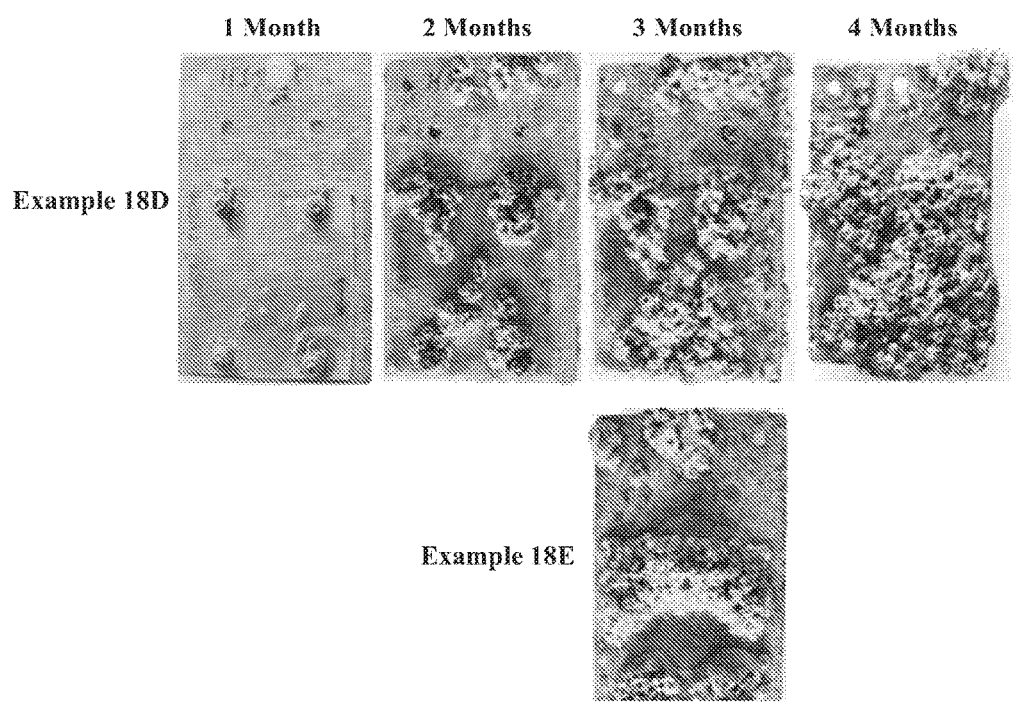
FIG. 17 is a perspective top view of the barnacle growth test results on the surfaces of Articles 18D and 18E.

Referring now to Table 10 and FIG. 17, Articles 18D and 18E are analyzed to determine surface energy and barnacle growth. "Static Immersion" barnacle growth field tests are conducted by Poseidon Sciences—Sacred Heart Marine Research Centre. FIG. 17 is a perspective view of the barnacle growth test results on the surfaces of Articles 18D and 18E.

TABLE 10

| Pattern | Surface energy, (mJ/m²) | Barnacle Growth (#) Month 1 | Barnacle Growth (#) Month 2 | Barnacle Growth (#) Month 3 | Barnacle Growth (#) Month 4 |
|---|---|---|---|---|---|
| Article 18D | 17 | 28 | 68 | 76 | 350 |
| Article 18E | 21 | 31 | 88 | 164 | 228 |

Figure 18:
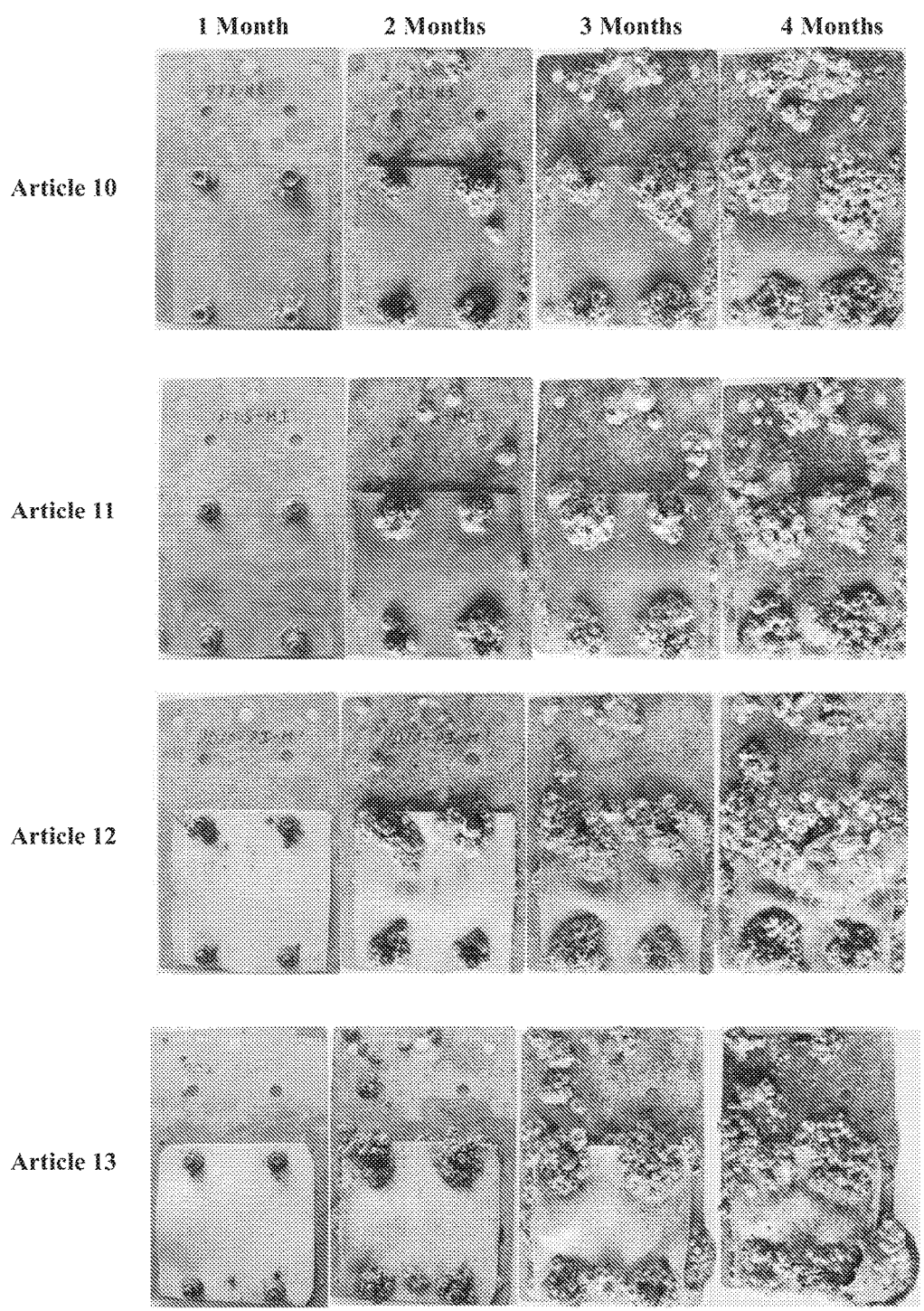
FIG. 18 is a perspective top view of the barnacle growth test results on the surfaces of Articles 10-13.

Referring now to Table 11 and FIG. 18, Articles 1-16 are analyzed to determine barnacle growth. "Static Immersion" barnacle growth field tests are conducted by Poseidon Sciences—Sacred Heart Marine Research Centre. FIG. 18 is a perspective view of the barnacle growth test results on the surfaces of Articles 10, 11, 12, and 13. All of Articles 1-16 have a surface topography defining a plurality of continuous parallel ridges spaced from about 25 to about 100 m from one another (Pattern H049—supplied by Hoowaki).

TABLE 11

| Article No. | Material | Barnacle Growth (#) Month 1 | Barnacle Growth (#) Month 2 | Barnacle Growth (#) Month 3 | Barnacle Growth (#) Month 4 |
|---|---|---|---|---|---|
| 1 | Example 3 | 49 | 130 | 350 | 450 |
| 2 | Example 4 | 79 | 312 | 463 | 500 |
| 3 | Example 5 | 12 | 39 | 60 | 75 |
| 4 | Example 8 | 32 | 56 | 167 | 222 |
| 5 | Example 11 | 36 | 213 | 288 | 400 |
| 6 | Example 12 | 10 | 62 | 157 | 274 |
| 7 | Example 15 | 14 | 54 | 63 | 65 |
| 8 | Example 16 | 22 | 86 | 103 | 332 |
| 9 | Example 17 | 26 | 72 | 80 | 217 |
| 10 | Example 18 | 16 | 45 | 73 | 97 |
| 11 | Example 19 | 11 | 45 | 67 | 98 |
| 12 | Example 2 + 0.5% Anti-fouling Additive A | 33 | 95 | 61 | 68 |
| 13 | Example 3 + 0.5% Anti-fouling Additive A | 13 | 70 | 80 | 92 |
| 14 | Example 12 + 0.5% Anti-fouling Additive A | 11 | 58 | 75 | 113 |
| 15 | Example 15 + 0.5% Anti-fouling Additive A | 14 | 50 | 65 | 89 |
| 16 | Example 17 + 0.5% Anti-fouling Additive A | 44 | 115 | 245 | 350 |

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

The invention claimed is:

1. An antifouling thermoplastic polyurethane (TPU) composition having a surface energy of from about 18 to about 26 mJ/m$^2$, said antifouling TPU composition comprising the reaction product of:
   (A) a polyetherol comprising polytetramethylene ether glycol;
   (B) a silicone polyol;
   (C) a chain extender different than said polyetherol and said silicone polyol; and
   (D) an isocyanate,
   wherein reactants (A) through (D) are reacted in the following amounts to form the reaction product:
   from about 25 to about 75 weight percent of said polyetherol,
   from about 2 to about 25 weight percent of said silicone polyol,
   from about 1 to about 15 weight percent of said chain extender, and
   from about 10 to about 60 weight percent of said isocyanate, based on the total weight of said reactants (A) through (D) reacted to form said reaction product.

2. An antifouling TPU composition as set forth in claim 1 wherein said silicone polyol comprises siloxane units.

3. An antifouling TPU composition as set forth in claim 2 wherein said silicone polyol has a hydroxyl functionality of 2.

4. An antifouling TPU composition as set forth in claim 1 wherein said silicone polyol has a viscosity at 25° C. of from about 20 to about 200 cSt.

5. An antifouling TPU composition as set forth in claim 1 wherein said polytetramethylene ether glycol has a hydroxyl number of from about 30 to about 1000 mgKOH/g.

6. An antifouling TPU composition as set forth in claim 1 wherein said chain extender is selected from the group of ethylene glycol, propylene glycol, butylene glycol, 1,4-butanediol, butenediol, butynediol, xylylene glycol, amylene glycol, 1,4-phenylene-bis-beta-hydroxy ethyl ether, 1,3-phenylene-bis-beta-hydroxy ethyl ether, bis-(hydroxymethyl-cyclohexane), hexanediol, thiodiglycol, and combinations thereof.

7. An antifouling TPU composition as set forth in claim 1 wherein said chain extender comprises 1,4-butanediol.

8. An antifouling TPU composition as set forth in claim 1 wherein said isocyanate comprises diphenylmethane diisocyanate (MDI) and/or polymeric diphenylmethane diisocyanate (pMDI).

9. An antifouling TPU composition as set forth in claim 1 wherein said reaction product further comprises a fluorinated polyol reacted into said reaction product.

10. An antifouling TPU composition as set forth in claim 1 further comprising an organometallic antifouling additive.

11. An antifouling TPU composition as set forth in claim 1 further comprising zinc pyrithione.

12. An article which is resistant to adhesion of organisms, said article including an antifouling thermoplastic polyurethane (TPU) composition comprising the reaction product of:
   (A) a polyetherol comprising polytetramethylene ether glycol;
   (B) a silicone polyol;
   (C) a chain extender different than said polyetherol and said silicone polyol; and
   (D) an isocyanate,
   wherein reactants (A) through (D) are reacted in the following amounts to form the reaction product:
   from about 25 to about 75 weight percent of said polyetherol,
   from about 2 to about 25 weight percent of said silicone polyol,
   from about 1 to about 15 weight percent of said chain extender, and
   from about 10 to about 60 weight percent of said isocyanate, based on the total weight of said reactants (A) through (D) reacted to form said reaction product, and
   wherein said article has a surface with a 3-dimensional surface topography and a surface energy of from about 18 to about 26 mJ/m$^2$.

13. An article as set forth in claim 12 wherein said 3-dimensional surface topography defines a plurality of parallel ridges, with each ridge having a height of from about 0.3 to about 150μπι and spaced about 0.3 to about 150μπι from one another to define valleys between adjacent ridges.

14. An article as set forth in claim 13 wherein a cross-sectional profile of each of said ridges defines a semi-elliptical or a polygonal configuration.

15. An article as set forth in claim 13 wherein said plurality of parallel ridges comprises discontinuous ridges.

16. An article as set forth in claim 13 wherein said plurality of parallel ridges comprises continuous ridges.

17. An article as set forth in claim 12 wherein said 3-dimensional surface topography defines a plurality of peaks, with each peak having a height of from about 0.3 to about 150μπι and spaced about 0.3 to about 150μπι from one another to define valleys.

18. An article as set forth in claim 12 wherein said surface has a surface energy which is from about 1 to about 70% less than the surface energy of a flat surface formed from said antifouling TPU composition.

* * * * *